United States Patent
Lee et al.

(10) Patent No.: US 11,921,252 B2
(45) Date of Patent: *Mar. 5, 2024

(54) SECURITY SCREENING DEVICE CAPABLE OF DETECTING AND LOCATING DANGEROUS OBJECTS BY USING RADIATION

(71) Applicant: KOREA ATOMIC ENERGY RESEARCH INSTITUTE, Daejeon (KR)

(72) Inventors: Byeongno Lee, Jeongeup-si (KR); Kyungmin Oh, Jeonju-si (KR); Namho Lee, Jeonju-si (KR); Moonsik Chae, Jeollabuk-do (KR); Jungho Mun, Jeongeup-si (KR); Yeongheum Yeon, Hwaseong-si (KR); Jinsik Ju, Busan (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 143 days.

This patent is subject to a terminal disclaimer.

(21) Appl. No.: 17/425,856

(22) PCT Filed: Jan. 28, 2020

(86) PCT No.: PCT/KR2020/001288
§ 371 (c)(1),
(2) Date: Jul. 26, 2021

(87) PCT Pub. No.: WO2020/153831
PCT Pub. Date: Jul. 30, 2020

(65) Prior Publication Data
US 2022/0187222 A1 Jun. 16, 2022

(30) Foreign Application Priority Data
Jan. 24, 2019 (KR) ........................ 10-2019-0009402

(51) Int. Cl.
*G01V 5/00* (2006.01)
*G01N 23/05* (2006.01)
*G01N 23/222* (2006.01)

(52) U.S. Cl.
CPC ........... *G01V 5/0033* (2013.01); *G01N 23/05* (2013.01); *G01N 23/222* (2013.01);
(Continued)

(58) Field of Classification Search
CPC ..... G01V 5/0033; G01N 23/05; G01N 23/222
See application file for complete search history.

(56) References Cited

U.S. PATENT DOCUMENTS 5,838,759 A * 11/1998 Armistead ........... G01V 5/0091
378/57
6,843,599 B2 1/2005 Le et al.
(Continued)

FOREIGN PATENT DOCUMENTS

JP  2006-510033 A  3/2006
JP  3827224 B2 * 9/2006 ........... G01V 5/0033
(Continued)

OTHER PUBLICATIONS

Hitachi Ltd—JP 3827224 B2—PE2E Search English translation obtained Mar. 7, 2023 (Year: 2023).*

(Continued)

*Primary Examiner* — David P Porta
*Assistant Examiner* — Casey Bryant
(74) *Attorney, Agent, or Firm* — Hauptman Ham, LLP

(57) ABSTRACT

The present invention relates a security screening device, comprising: a radiation generator for respectively generating X-rays and neutron beams and irradiating same toward an inspection object; an inspection object transfer unit for changing the position of the inspection object; a radiation detector configured to respectively detect X-rays and neu- (Continued)

tron beams transmitted through the inspection object; and a gamma ray detector installed adjacent to the inspection object and configured to detect a gamma signal generated from the inspection object, wherein the radiation detector acquires image information of the inspection object by using radiation information detected from the X-rays and neutron beams that have passed through the inspection object, and the gamma ray detector analyzes the detected gamma ray to detect the location of the inspection object from the analysis of the inspection object and the image information.

20 Claims, 13 Drawing Sheets

(52) U.S. Cl.
CPC .......... *G01V 5/0008* (2013.01); *G01V 5/0041* (2013.01); *G01V 5/0069* (2016.11)

(56) References Cited

U.S. PATENT DOCUMENTS

| | | | | |
|---|---|---|---|---|
| 7,313,221 | B2* | 12/2007 | Sowerby | G01N 23/10 250/269.4 |
| 8,374,310 | B2* | 2/2013 | Kang | H05H 6/00 378/57 |
| 8,963,094 | B2 | 2/2015 | Gozani et al. | |
| 10,705,243 | B2* | 7/2020 | Lee | G01N 23/02 |
| 2010/0038550 | A1* | 2/2010 | DeVito | G01V 5/0069 250/370.11 |
| 2010/0246763 | A1* | 9/2010 | Kang | G21B 1/19 378/57 |
| 2014/0270034 | A1* | 9/2014 | Clayton | G01V 5/0091 376/154 |
| 2015/0323685 | A1 | 11/2015 | Nelson et al. | |
| 2016/0238543 | A1* | 8/2016 | Powell | G01N 23/10 |

FOREIGN PATENT DOCUMENTS

| | | |
|---|---|---|
| JP | 2014-228401 A | 12/2014 |
| KR | 10-0958225 B1 | 5/2010 |
| KR | 10-2012-0069228 A | 6/2012 |
| KR | 10-2012-0122665 A | 11/2012 |
| KR | 10-2012-0137045 A | 12/2012 |
| KR | 10-1304104 B1 | 9/2013 |
| KR | 10-1311787 B1 | 9/2013 |
| KR | 10-1378757 B1 | 3/2014 |
| KR | 10-1682088 B1 | 12/2016 |
| KR | 10-2020-0007591 A | 1/2020 |

OTHER PUBLICATIONS

International Search Report issued for corresponding International Patent Application No. PCT/KR2020/001288 dated May 18, 2020, along with an English translation.
Written Opinion issued for corresponding International Patent Application No. PCT/KR2020/001288 dated May 18, 2020.

* cited by examiner

SECURITY SCREENING DEVICE CAPABLE OF DETECTING AND LOCATING DANGEROUS OBJECTS BY USING RADIATION

CROSS-REFERENCE TO RELATED APPLICATIONS

This application is the National Stage filing under 35 U.S.C. 371 of International Application No. PCT/KR2020/001288, filed on Jan. 28, 2020, which claims the benefit of earlier filing date and right of priority to Korean Application No. 10-2019-0009402, filed on Jan. 24, 2019, the contents of which are all hereby incorporated by reference herein in their entirety.

TECHNICAL FIELD

The present disclosure relates to a security screening device capable of detecting dangerous objects or hazardous materials using radiation.

BACKGROUND ART

Non-destructive testing (NDT) has been commonly used in a wide range of fields such as medicine, security, and quarantine or inspection.

A security screening device is an example of such a non-destructive testing system, which uses radiation for visual identification of an object to detect illegal weapons, such as a gun, a knife and a sword, and contraband (or smuggled goods). The security screening device refers to a device used in airports and ports for scanning cargo or mails. Radiation is irradiated toward an object that can be loaded with import and export cargo to create an image, and the generated image is examined to identify unauthorized or potentially threatening items that may be located or hidden in the object.

In general, security screening devices detect dangerous goods or hazardous materials using an image created by projecting a beam of X-rays toward an object. In this case, however, a shape of an object can only be visually identified through an image generated by using X-rays, and substance (or material) information of the object cannot be identified.

In consideration of this, in the related art security screening device, neutron radiation is additionally irradiated toward an object. However, a radiation generator for producing neutrons and a detection system for detecting neutrons should be separately manufactured to thereby increase the costs. Further, since image information of an object that was irradiated by two different forms or types of radiation has to be separately obtained from transmitted radiation, the system needs to be enlarged.

In addition, in the related art security screening device, even when neutron radiation is used, it is difficult to discern information of an object containing a material (or component) with a similar feature or composition. In particular, since a hazardous material, such as explosives, illegal drugs, nuclear substances, nuclear terror radiation sources, and the like, is formed of a powder or liquid material hard to specify, it may not be easily identified by the security screening device when loaded with cargo having a similar feature (e.g., explosives in a flour sack).

When neutron radiation is additionally irradiated to an object for obtaining its material information, interference may occur between neutrons and X-rays passed through the object, which may act as noise, causing a decrease in image information quality of the object. Accordingly, even when neutron radiation is used, it is difficult to obtain information of an object containing materials having similar features.

Therefore, a security screening device that can enable quick inspection of cargo and mails at airports and ports, and quickly detect the presence of an unauthorized item or hazardous material by irradiating radiation to containers loaded with incoming and outgoing cargo and reading (or examining) images obtained therefrom is required.

In addition, a security screening device that can provide a new method or technique is required to enable quick inspection of cargo and mails at airports and ports using X-rays and neutron radiation and to reduce interference between transmitted X-rays and neutron radiation to thereby acquire quality image information of an object.

SUMMARY

The present disclosure describes a security screening device that can detect explosives, illegal drugs, nuclear materials, and nuclear terror radiation sources by irradiating X-rays and neutron radiation to an inspection subject.

The present disclosure also describes a security screening device that can produce both X-rays and neutron radiation using one device, and acquire image information of an inspection object using X-rays and neutron radiation passed through the inspection object that was irradiated by X-rays and neutron radiation.

The present disclosure also describes a security screening device that can produce radiation of different energies using one device, and achieve size and weight reduction by combining several devices or (units) into one device.

The present disclosure also describes a security screening device equipped with a radiation generator capable of generating various types of radiation having different energies and a radiation detector capable of collectively detecting different types of radiation passed through an inspection object.

The present disclosure also describes a security screening device that can improve the quality of image information by reducing mutual interference between X-rays and neutron radiation passed through an inspection object.

The present disclosure also describes a security screening device that can trace or identify a location of a hazardous material by thoroughly and accurately analyzing a gamma-ray energy spectrum produced through a neutron activation analysis.

According to one aspect of the subject matter described in this application, a security screening device includes: a radiation generator configured to produce an X-ray and neutron radiation and irradiate the X-ray and the neutron radiation toward an inspection object; an inspection object transfer unit configured to change a position of the inspection object; a radiation detector configured to detect an X-ray and neutron radiation passed through the inspection object; and a gamma ray detector that is installed adjacent to the inspection object and is configured to detect a gamma signal generated from the inspection object. The radiation detector may obtain image information of the inspection object using radiation information detected from the X-ray and the neutron radiation passed through the inspection object, and the gamma ray detector may analyze a detected gamma ray to analyze the inspection object, and identify a location of the inspection object from the image information.

Implementations according to this aspect may include one or more of the following features. For example, the gamma ray detector may measure and analyze a detection time of a gamma ray produced by the collision of a neutron with the inspection object, so as to derive the location of the inspection object.

In some implementations, the gamma ray detector may analyze a substance of the inspection object by producing a gamma-ray spectrum from the received gamma signal.

In some implementations, the gamma ray detector may be installed adjacent to the object transfer unit, and at least one gramma ray detector may be provided.

In some implementations, an imaging system configured to obtain image information regarding the inspection object using radiation information detected from the X-ray and the neutron radiation that have passed through the inspection object may be further provided.

In some implementations, a controller may be further provided. The controller may be configured to transmit a synchronization signal to the radiation generator and the radiation detector so that the radiation generator and the radiation detector are synchronized with each other.

In some implementations, the X-ray and the neutron radiation may be alternately produced with a predetermined time difference by the radiation generator to be irradiated toward the inspection object.

In some implementations, the radiation generator may include: an electron gun configured to produce an electron beam; an electron accelerator that is connected to the electron gun and is configured to accelerate the electron beam generated by the electron gun; and a target module that is connected to the electron accelerator and is configured to generate radiation by being irradiated with the electron beam accelerated by the electron accelerator.

In some implementations, the target module may include: a housing having one open end and provided therein with a vacuum chamber; an inner case having a cylindrical shape that protrudes toward the vacuum chamber to be installed inside the housing and including an electron beam inlet hole formed on a front portion thereof so as to allow the electron beam to be incident toward the housing; a cover plate fixedly installed on the housing to cover the open one end of the housing; a driving part including a rotating shaft installed through the cover plate and the inner case, and a motor configured to rotate the rotating shaft; and a radiation generating target that is coupled to the rotating shaft to rotate in one direction and is configured to produce radiation of different energies as the incident electron beam passes therethrough.

In some implementations, a radiation irradiation hole may be formed on the cover plate in a position that overlaps the electron beam inlet hole, and the radiation generated by the radiation generating target may pass through the radiation irradiation hole.

In some implementations, the radiation generating target may include a rotating shaft support portion configured to support the rotating shaft, and a plurality of targets installed along an outer circumference of the rotating shaft support portion to be spaced apart therefrom by a predetermined distance.

In some implementations, the radiation generating target may be configured such the radiation generating target is configured such at least one target of the plurality of targets for generating different types of radiation is disposed at each region of the plate divided into a plurality of regions. The driving part may be connected to the radiation generating target through the rotating shaft so as to allow the radiation generating target to rotate, and determine a target to which the electron beam is irradiated.

In some implementations, the plurality of targets may be made of different materials and generate radiation of different energies as the electron beam passes therethrough, and the radiation generating target may produce radiation of different energies by the plurality of targets disposed on a propagation path of the electron beam while rotating at a predetermined rotation speed together with the rotating shaft.

In some implementations, the driving unit may include a bevel gear having one end connected to the motor and another end connected to the rotating shaft, so as to transfer a rotational force generated from the motor to the rotating shaft.

In some implementations, the radiation generator may further include a trigger system configured to synchronize the electron gun, the electron accelerator, and the target module with each other so that a position of a target of the target module is changed according to a speed of electron beam generation of the electron gun 112.

In some implementations, when an X-ray and neutron radiation are irradiated with a time difference by the radiation generator, the radiation detector may receive a synchronization signal to detect the X-ray or the neutron radiation.

In some implementations, the radiation detector may include a radiation detector body extending in a vertical direction and having a rectangular column shape, and a plurality of radiation image sensor modules installed inside the radiation detector body in a stacking manner and configured to detect the X-ray and the neutron radiation irradiated by the radiation generator.

In some implementations, the plurality of radiation image sensor modules may include: an X-ray scintillator that interacts with the X-ray to emit scintillation; a neutron scintillator that interacts with the neutron radiation to emit scintillation; and a photodetector configured to detect the scintillation emitted from the X-ray scintillator or the neutron scintillator.

According to another aspect, a security screening device includes: a radiation generator configured to produce an X-ray and neutron radiation and irradiate the X-ray and the neutron radiation toward an inspection object; an inspection object transfer unit configured to change a position of the inspection object; a shielding unit that is installed along a propagation path of the X-ray and the neutron radiation and selectively allows the X-ray and the neutron radiation to pass therethrough to prevent interference between the X-ray and the neutron radiation; and a radiation detector that is located at an opposite side of the radiation generator with the inspection object interposed therebetween and is configured to detect an X-ray and neutron radiation that pass through the inspection object.

Implementations according to this aspect may include one or more of the following features. For example, the radiation detector may include an X-ray detection part configured to obtain image information regarding a shape of the inspection object from the X-ray passed through the inspection object, and a neutron radiation detection part that is disposed adjacent to the X-ray detection part and is configured to obtain image information regarding a substance of the inspection object from the neutron radiation passed through the inspection object.

In some implementations, the X-ray detection part and the neutron radiation detection part may be integrally formed.

In some implementations, the X-ray detection part and the neutron radiation detection part may be spaced apart from each other while forming a predetermined angle with respect to a propagation direction of the X-ray and the neutron radiation passed through the inspection object.

In some implementations, the shielding unit may include an X-ray shielding part installed adjacent to a front side of the neutron radiation detection part to absorb an X-ray, and a neutron radiation shielding part vertically disposed with respect to the X-ray shielding part and located adjacent to a front side of the X-ray detection part to shield neutron radiation.

In some implementations, a controller configured to transmit a synchronization signal to the radiation generator and the radiation detector to make the radiation generator and the radiation detector synchronize with each other may be further provided. The controller may transmit a signal for distinguishing a time at which an X-ray reaches the X-ray detection part and a time at which neutron radiation reaches the neutron radiation detection part.

According to the implementations of the present disclosure, an X-ray and neutron radiation may be simultaneously produced by a radiation generator to project them at an inspection object to obtain image information, allowing the contents (or materials) of the inspection object to be distinguished.

Also, with a structure of the radiation generator, X-rays and neutron radiation may be selectively produced without requiring separate devices for generating the X-rays and the neutron radiation, allowing an installation space and manufacturing costs to be reduced. Unlike the conventional technique that only relies on X-rays, neutron radiation is used to figured out substance or material information. Such a non-destructive testing system having a compact structure may be used in security screening devices or apparatuses for establishing a social security network.

In addition, image information regarding an inspection object may be acquired by a radiation detector capable of detecting an X-ray and neutron radiation from the inspection object that was irradiated by radiation of different energies.

Interference between X-ray and neutron radiation passed through the inspection object may be prevented or reduced by a shielding unit, allowing a quality image to be acquired for analyzing the inspection object. Also, mutual interference between the X-ray and neutron radiation passed through the inspection object may be suppressed by adjusting a position of the shielding unit.

By alternately irradiating a beam of X-rays and a beam of neutron radiation with a time difference by the radiation generator, synchronizing the radiation generator and the radiation detector with each other, and separately processing information by the X-ray and information by the neutron radiation according to a synchronization signal, an image conveying substance information may be created while maintaining a high resolution. By thoroughly and accurately analyzing a gamma-ray energy spectrum produced through neutron activation analysis, a location of a hazardous material may be traced, allowing explosives, illegal drugs, nuclear materials, and nuclear terror radiation sources to be identified.

In addition, with a configuration of the radiation generator that includes an electron gun, an electron accelerator, and a target module, radiation of different energies may be selectively generated without a plurality of devices for generating various forms or types of radiation. This may result in reducing an installation space and the costs.

Using the radiation detector capable of collectively detecting radiation passed through an inspection object that was irradiated by radiation of different energies, a smaller device can be achieved. In addition, as radiation produced by the radiation generator that is reduced in weight is irradiated toward the inspection object, image information using radiation passed through the inspection object may be acquired.

Figure 15:
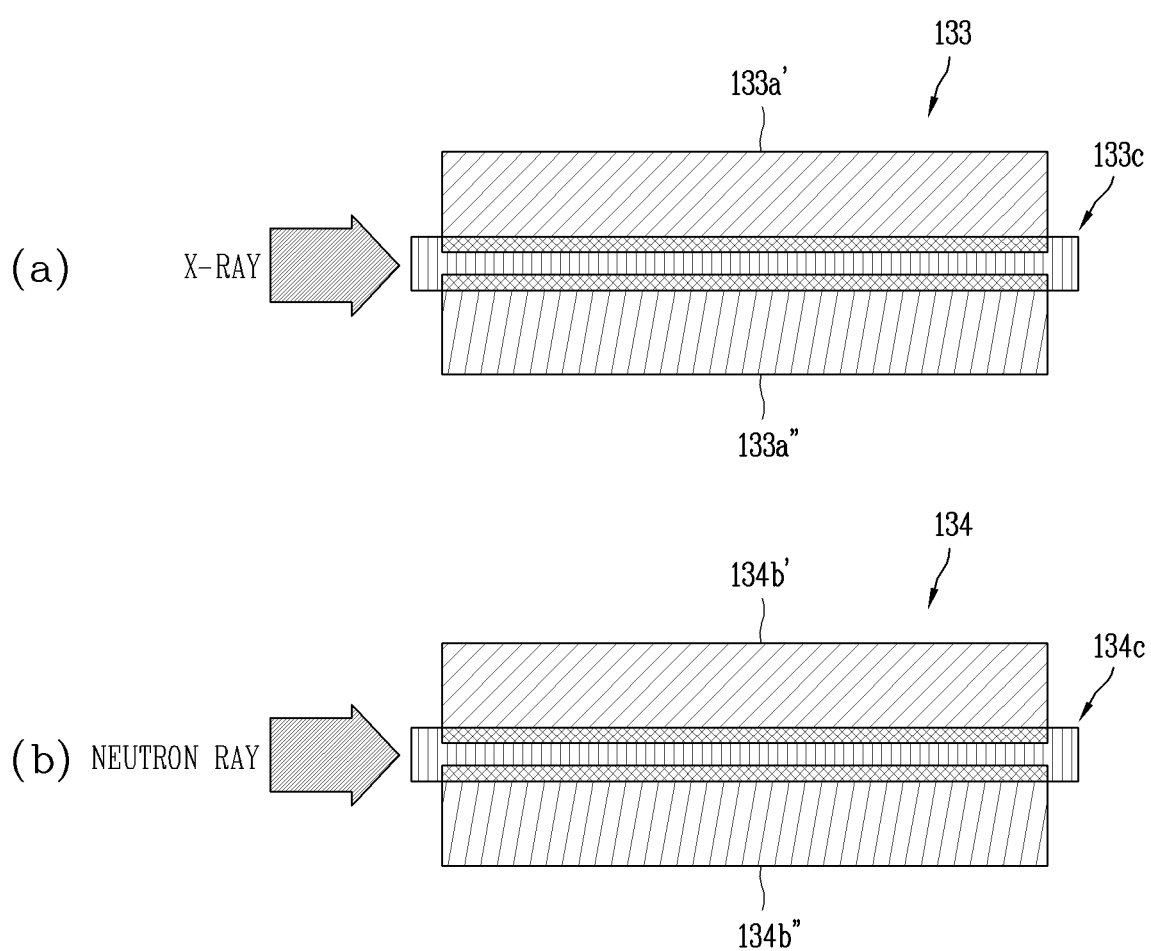

(a) and (b) of FIG. 15 are enlarged views of a radiation detector, respectively illustrating a neutron radiation detection part and an X-ray detection part.

Figure 16:
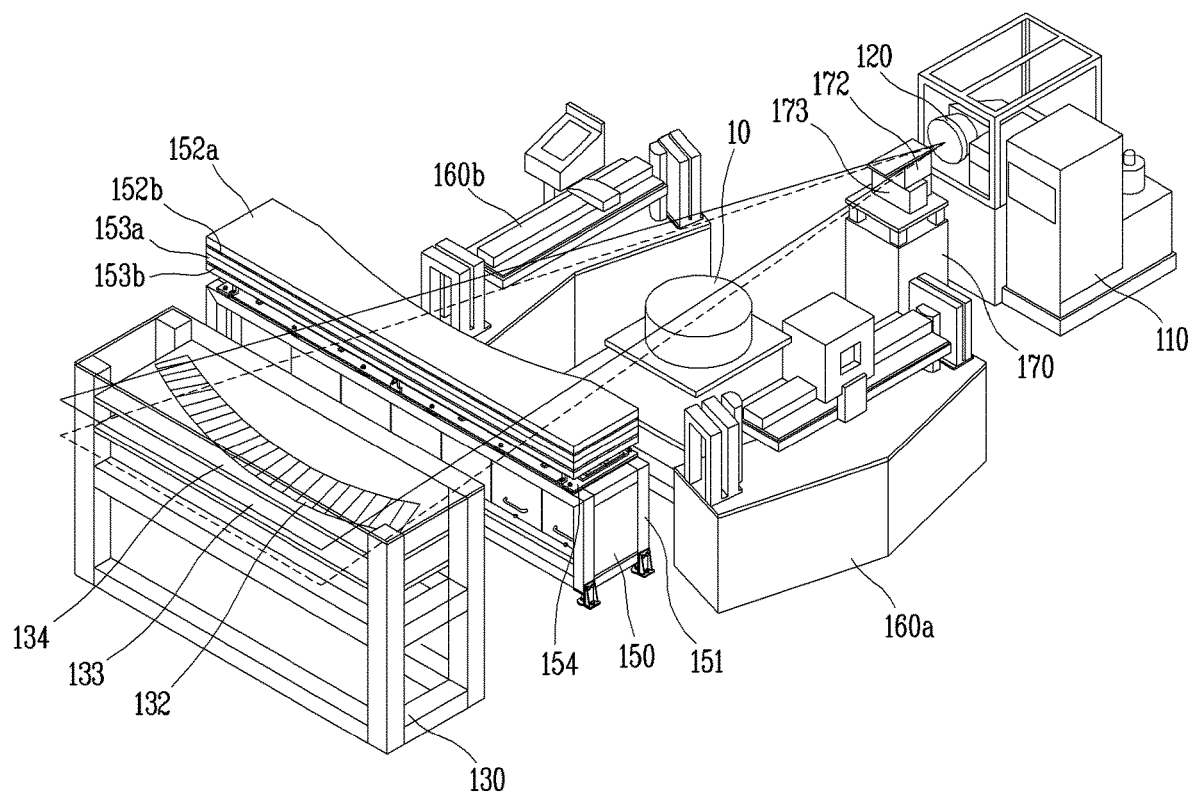

FIG. 16 illustrates a security screening device according to another implementation of the present disclosure.

Figure 17:
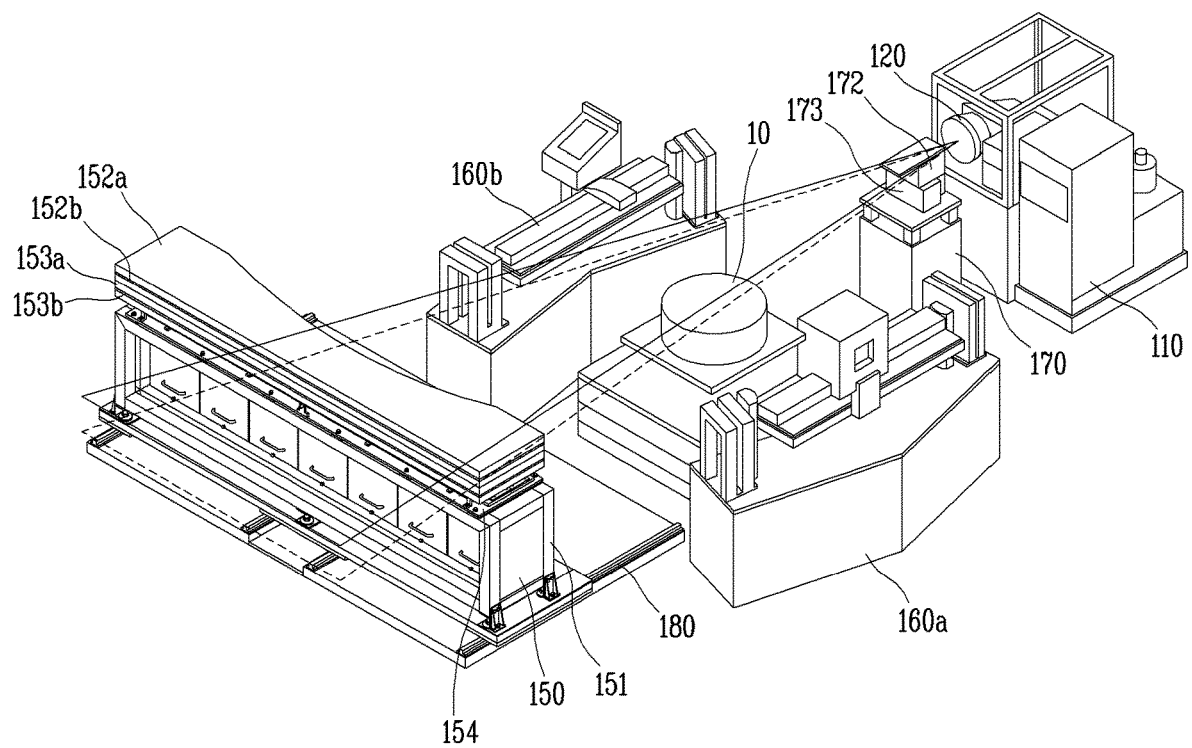

FIG. 17 illustrates a security screening device according to another implementation of the present disclosure.

DETAILED DESCRIPTION

Description will now be given in detail according to one or more implementations disclosed herein, with reference to the accompanying drawings. In the drawings, the same or similar elements are designated with the same or similar reference numerals, and redundant description has been omitted. The suffixes "module" and "unit" for components or elements used in the following description are given or mixed in consideration of ease in creating specification, and do not have distinct meanings or roles. In describing implementations, if a detailed explanation for a related known technology or construction is considered to unnecessarily divert the main point, such explanation has been omitted but would be understood by those skilled in the art. Also, it should be understood that the accompanying drawings are merely illustrated to easily explain the concept, and therefore, they should not be construed to limit the technological concept disclosed herein by the accompanying drawings, and the concept should be construed as being extended to all modifications, equivalents, and substitutes included in the concept and technological scope.

Terms including ordinal numbers such as first and second may be used to describe various elements, but the elements are not limited by the terms. The terms are used merely for the purpose to distinguish an element from another element.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

Singular expressions include plural expressions unless the context clearly indicates otherwise.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, elements, components or combinations thereof are not excluded in advance.

Figure 1:
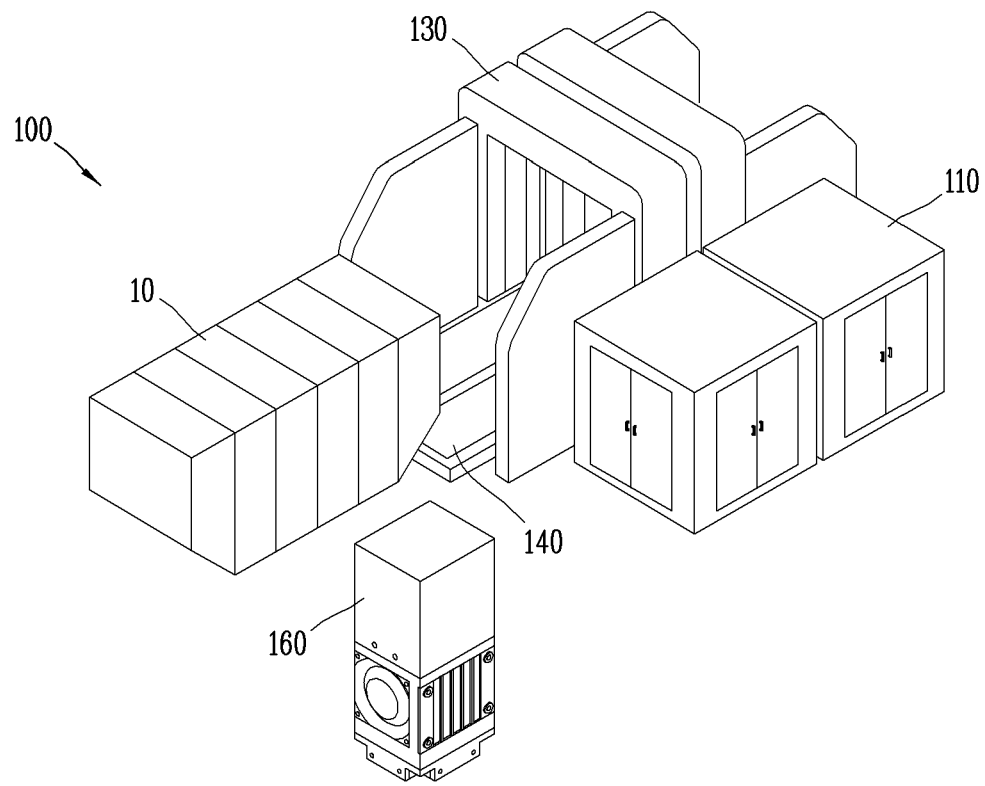
FIG. 1 is a schematic view illustrating an appearance of an example of a security screening device.
Figure 2:
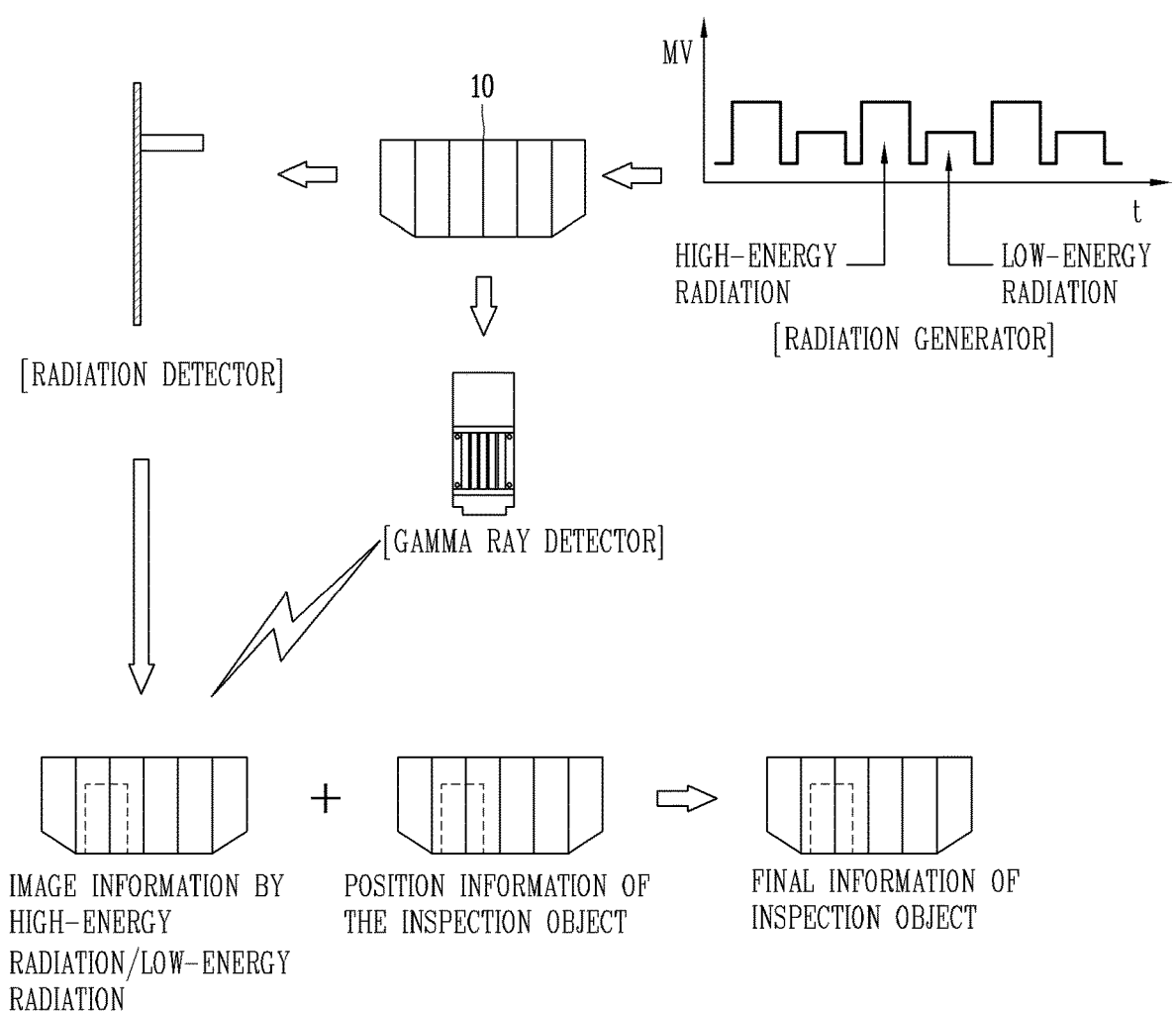
FIG. 2 is a schematic view illustrating a process of obtaining final information of an inspection object according to operation of the security screening device.

FIG. 1 is a schematic view illustrating an appearance of an example of a security screening device, and FIG. 2 is a schematic view illustrating a process of obtaining final information of an inspection object according to operation of the security screening device.

A non-destructive testing (NDT) system is to evaluate the internal properties of a product without causing damage to it, which refers a set of equipment for implementing non-destructive testing. The NDT system can be used in various industries such as medicine, security, quarantine, and the like. The NDT system, in particular, can be used in a security screening device 100 for screening aviation luggage (or baggage), cargo and mails at airports and ports, and containers loaded with incoming and outgoing cargo.

The security screening device 100 may refer to a system that uses radiation to penetrate into an object to be screened or inspected (hereinafter, "inspection object") 10 and obtains information regarding the inspection object 10 using radiation passed through the inspection object 10. Here, the inspection object 10 may refer to various items, such as air cargo, containers, and traveler's carry-on luggage, subject to security screening.

The security screening device 100 may refer to a system designed to acquire image information regarding the inspection object 10 by detecting radiation of different energies passed through the inspection object 10.

The security screening device 100 may include a radiation generator (or radiation generating unit) 110, a radiation detector (or radiation detection unit) 130, an inspection object transfer unit 140, a gamma ray detector (or gamma-ray detection unit) 150, and an imaging system (not shown).

The radiation generator 110 is configured to generate radiation of different energies and emit them toward the inspection object 10. Here, radiation having different magnitudes of energies may refer to X-rays and neutron radiation (or neutron ray), respectively.

The radiation generator 110 may produce an X-ray and neutron radiation having different energies in an integrated manner and irradiate them toward the inspection object 10. A beam of X-rays may be irradiated to the inspection object for obtaining image information regarding a shape of the inspection object 10, and a beam of neutron radiation may be used for screening substance (or material) information, such as PVC, graphite, sugar, wood, glass, radioactive material, Al, Fe, and Pb, of the inspection object 10.

The radiation generator 110 may accelerate an electron beam E produced by an electron gun (or electron emitter) 112 (see FIG. 3) in an electron accelerator 113, and collide the accelerated electron beam E with a target module 120 to form radiation. The radiation generator 110 may also produce radiation of different energies in the form of pulsed radiation.

As illustrated in FIG. 2, the radiation generator 110 may produce radiation with low (lower) energy and radiation with high (higher) energy, each having a pulse signal, and alternately generate low-energy radiation and high-energy radiation to irradiate them toward the inspection object 10.

Here, the low-energy radiation may be X-rays, and the high-energy radiation may be neutron radiation.

The inspection object transfer unit 140 is configured to change a position of the inspection object 10 and is used to transfer the inspection object 10 placed thereon in one direction, as shown in FIG. 1.

As both an X-ray and neutron radiation produced by the radiation generator 110 can pass through the inspection object 10 moved at a constant speed by the inspection object transfer unit 1, the security inspection device 100 may be configured to obtain information regarding the inspection object 10.

The radiation detector 130 is configured to detect an X-ray and neutron radiation transmitted through the inspection object 10. The radiation detector 130 detects each radiation passed and transmitted through the inspection object 10 that was irradiated by radiation of different energies (e.g., X-ray and neutron radiation produced by the radiation generator 110. The radiation detector 130 includes a radiation detector body 131 (see FIG. 6) and a plurality of radiation image sensor modules 132 (see FIG. 6).

In addition, the security screening device 100 according to the present disclosure may further include a collimator.

The collimator may be installed along a propagation (or traveling) direction of radiation produced by the radiation generator 110. The collimator may be provided in plurality. The collimator may include a radiation generator (RG) collimator installed adjacent to the radiation generator 110, a pre-object collimator located at a position immediately before radiation is irradiated to the inspection object 10, and a detector collimator located at a position immediately before radiation passed through the inspection object 10 is detected by the radiation detector 130.

Each collimator is installed along a propagation direction of radiation, and adjusts a direction, width, and angle of radiation produced by the radiation generator 110 to guide the radiation to the inspection object 10. A slit formed on each collimator allows radiation having a predetermined shape and a width to be irradiated to the inspection object 10.

In addition, a slit size of the detector collimator may affect a length of a radiographic image per shooting. A transfer speed of the inspection object 10 by the inspection object transfer unit 140 may be determined according to generation of radiation or acquisition of frequencies controlled by a trigger signal generator.

The imaging system (not shown) creates an image based on a result detected by the radiation detector 130. The imaging system (not shown) is configured to generate image information in association with the inspection object based on X-rays passed through the inspection object 10.

The imaging system (not shown) may acquire image information regarding the inspection object 10 using information of radiation passed through the inspection object 10 that was irradiated with radiation produced by the radiation generator 110.

In addition, the security screening device 100 according to the present disclosure may use the gamma ray detector 160 to analyze a hazardous material and identify a location of the hazardous material through neutron activation analysis.

When neutrons produced by the radiation generator 110 are irradiated to the inspection object 10, gamma rays (or gamma radiation) (γ) are emitted from the inspection object 10. The gamma ray detector 160 analyzes these gamma rays (γ) using the neutron activation analysis to thereby identify a location of a hazardous material, such as explosives, illegal drugs (or narcotics), nuclear materials, and nuclear terror radiation sources, contained or hidden in the inspection object 10.

Neutron activation analysis (NAA) is a method of quantitative analysis used to determine the amount or concentrations of elements present in a sample by measuring gamma rays emitted from the sample that was irradiated by neutrons, causing the elements in the sample to form radioactive isotopes. The NAA relies on analysis of the density or dose of gamma rays emitted from a sample that was irradiated by neutrons, thereby allowing non-destructive analysis.

In the conventional security screening device, only a beam of X-rays is used to screen an inspection object. When a hazardous material, such as explosives, illegal drugs, nuclear materials, and nuclear terror radiation sources, is formed of a powder or liquid material hard to identify, or when a hazardous material is loaded with cargo formed of a similar substance, the hazardous material located in the inspection object may not be easily identified, making it difficult to specify a location of the hazardous material in the inspection object.

The gamma ray detector 160 of the present disclosure may perform quantitative analysis on a gamma-ray energy spectrum by using gamma-ray spectroscopy that analyzes gamma rays produced by neutrons incident on an inspection object. The gamma-ray energy spectrum may be produced by measuring the energy of gamma ray photons having high energy (or high energy level), which are highly particulate in nature. When analyzing the gamma-ray energy spectrum obtained by the gamma ray detector 160, it is compared with the existing data of hazardous materials, such as explosives, illegal drugs, nuclear materials, and nuclear terror radiation sources, to determine whether a match exists, allowing a hazardous material contained in the inspection subject to be accurately identified.

Gamma-ray spectroscopy is an example of the NAA, which is used for sodium iodide (NaI) scintillation counters and germanium detectors. By analyzing gamma rays using the gamma-ray spectroscopy, analysis of a tiny amount of an element, which cannot be achieved through chemical analysis, can be available, and several elements of various types of samples can be simultaneously analyzed in a non-destructive manner.

The gamma ray detector 160 may be implemented by using a high-resolution room-temperature semiconductor detector capable of 3D position sensing and Compton imaging, allowing a gamma-ray energy spectrum generated through the NAA to be thoroughly analyzed. Further, a location of a hazardous material, such as a nuclear material and a nuclear terror radiation source, in cargo, may be tracked to thereby identify hazardous materials and the like, which is difficult to screen or inspect using the conventional or existing systems at airports and ports.

In addition, when at least two gamma ray detectors 160 are installed at the security screening device 100, coordinates on X, Y, and Z axes of a hazardous material contained or hidden in the inspection object 10 may be accurately detected by triangulation to thereby derive a location of the hazardous material.

That is, as shown in FIG. 2, a neutron having higher energy and an X-ray having lower energy produced by the radiation generator 110 are irradiated to the inspection object 10, and are then detected by the radiation detector 130 to thereby acquire image information regarding the inspection object 10. In addition, a gamma ray produced when a neutron collides with the inspection object 10 is analyzed by the gamma ray detector 160 to obtain location or position information of the inspection object 10.

Figure 3:
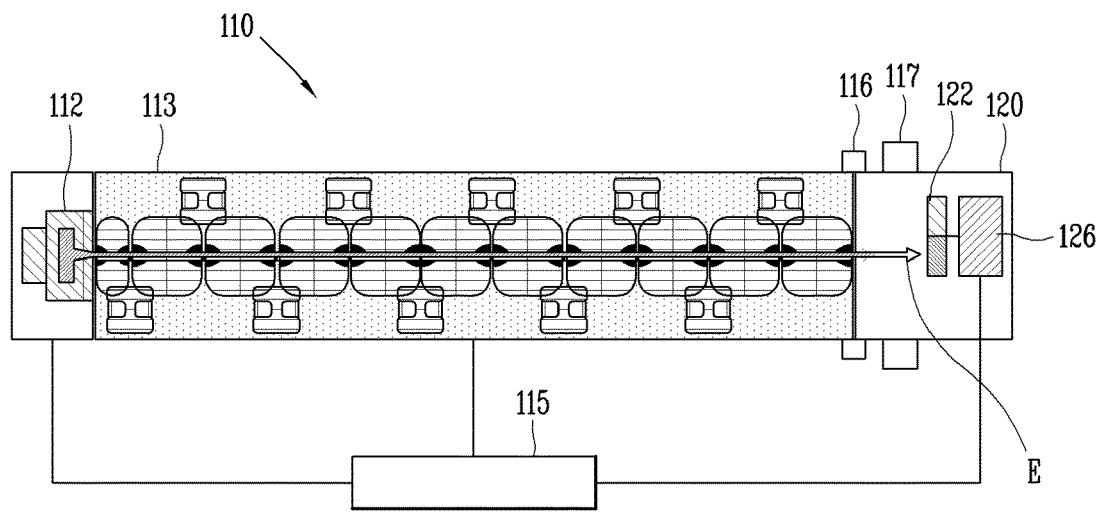
FIG. 3 is a schematic view of a radiation generator.

FIG. 3 is a schematic view of a radiation generator.

The radiation generator 110 may selectively produce at least one of several types of radiation having different energies.

The radiation generator 110 accelerates an electron beam E generated by the electron gun 112 in the electron accelerator 113, and collides the accelerated electron beam E with the target module 120 to produce radiation.

The radiation generator 110 may include the electron gun 112 that produces an electron beam E, the electron accelerator 113 that is connected to the electron gun 112 and accelerates an electron beam E generated by the electron gun 112, and the target module 120 that produces radiation by being irradiated with an electron beam E accelerated by the electron accelerator 113.

Radiation desired may be produced by accelerating an electron beam E produced by the electron gun 112 in the electron accelerator 112 and colliding the accelerated electron beam E with the target module 120.

In order for the radiation generator 110 to produce radiation, one electron gun 112, one electron accelerator 113, and one target module 120 are required for each type of radiation. In the present disclosure, as a desired type of radiation is produced at a desired speed through a radiation generating target 122 installed at the target module 120, a plurality of devices for generating various types of radiation are not required, allowing an installation space and the costs to be reduced. This may also reduce the hassle of individually operating necessary devices.

The electron gun 112 includes an electrode, so as to allow an electron beam E to be generated when current is applied to the electrode. The electron accelerator 113 is configured to accelerate an electron beam E produced by the electron gun 112. An electron beam E is accelerated while sequentially passing through a bundler cavity and an acceleration cavity provided in the electron accelerator 113.

The radiation generator 110 may alternately produce an X-ray and neutron radiation with a time difference through the target module 120. For example, by controlling the target module 120, an X-ray and neutron radiation may be alternately generated according to a set time.

In the radiation generator 110 according to the present disclosure, separate devices for generating different types of radiation are not required, enabling an installation space and the costs to be reduced. This may also reduce the hassle of individually operating necessary devices.

Further, a flow or traveling path of the accelerated electron beam E may be changed by a magnetic field produced by an electromagnet 117 installed at one side of the acceleration cavity, which may in turn guide the flow of electron beam E toward a neutron target or an X-ray target.

The radiation generator 110 may further include a trigger signal system 115 configured to synchronize the electron gun 112, the electron accelerator 113, and the target module 120 with each other, so that a position of a target of the target module 120 is changed according to a speed of electron beam produced by the electron gun 112.

The trigger signal system 115 is designed to synchronize the electron gun 112 of the radiation generator 110 with the target module 120. The trigger signal system 115 transmits a synchronization signal to the electron gun 112 and the target module 120 to thereby produce desired type of radiation at a desired repetition rate.

For example, the trigger signal system 115 may transmit a synchronization signal to the electron gun 112 to control an irradiation speed and a repetition rate of an electron beam E, and transmit a synchronization signal to the target module 120 to determine the type of radiation produced when an electron beam E generated in the electron gun 112 collides with the radiation generating target 122 and its repetition rate. For instance, when a total of three targets are installed at the radiation generating target 122, and a repetition rate of electron beam generation is set to 300 Hz, a rotation speed of the radiation generating target 122 may be synchronized to the repetition rate of electron beam generation of 300 Hz to thereby produce each different type of radiation per 100 Hz.

In the present disclosure, the radiation generating target 122 included in the target module 120 may be synchronized with the trigger signal system 115 so as to obtain the desired type of radiation even at a high speed of 600 rpm or higher, and the radiation generator 110 may selectively produce X-rays, neutron radiation, gamma rays, or electron beams desired using the target module 120.

Figure 4:
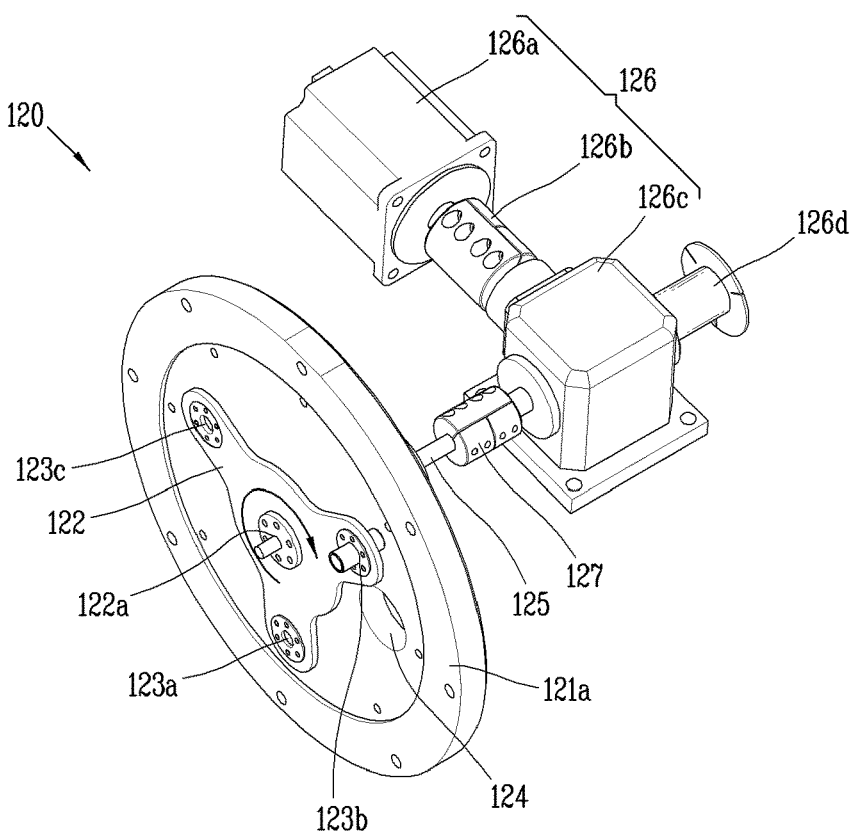
FIG. 4 is a perspective view of a target module.
Figure 5:
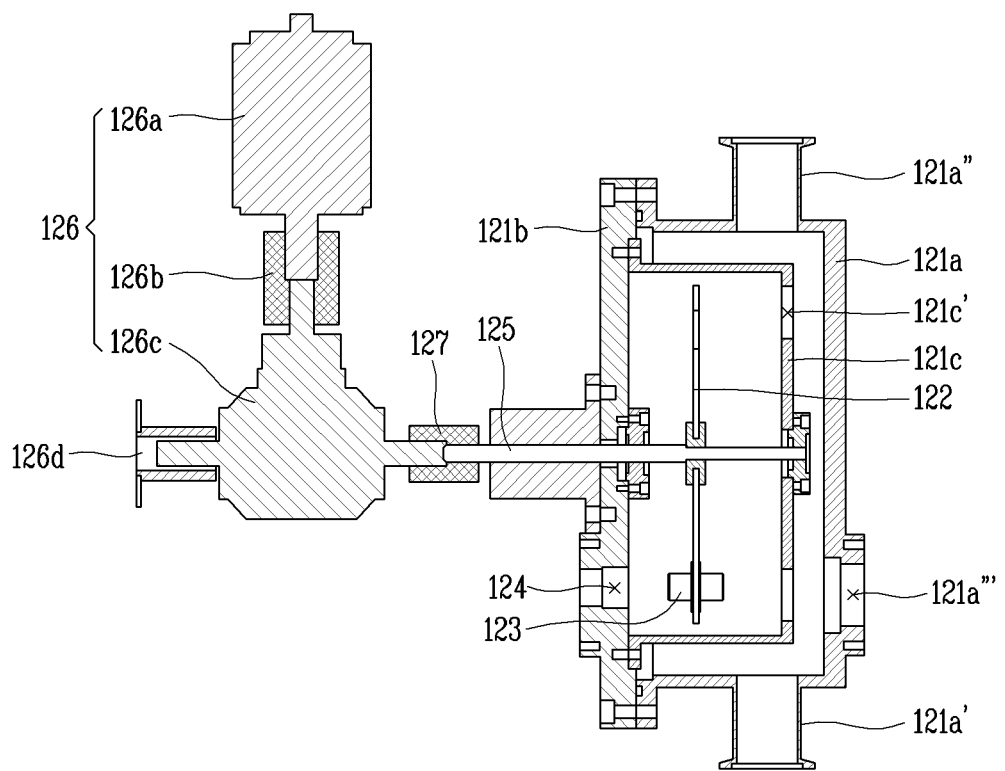
FIG. 5 is a side cross-sectional view of the target module.

FIG. 4 is a perspective view of a target module, and FIG. 5 is a side cross-sectional view of the target module.

The target module 120, which is included in the radiation generator 110, may be configured to produce various types of radiation. Radiation may be generated by accelerating an electron beam E produced by the electron gun 112 (see FIG. 3) in the electron accelerator 113 and colliding the accelerated electron beam E with the target module 120.

The target module 120 may include a housing 121a that defines an outer appearance, a cover plate 121b, a radiation generating target 122, and a driving (or drive) part 126.

The housing 121a may have a cylindrical shape and be provided therein with a space in which a vacuum chamber is formed. The housing 121a may be made of a metal material such as a stainless steel.

A vacuum state may be created inside the housing 121a, and an electron beam E accelerated by the electron accelerator 113 may be incident through an outer front portion of the housing 121a.

The cover plate 121b may be installed inside the housing 121a. The cover plate 121b may be fixedly installed inside the housing 121a.

The electron beam E incident from the housing 121a may collide with the radiation generating target 122, which is configured to rotate relative to the cover plate 121b inside the housing 121a, to produce radiation. Here, a radiation irradiation hole 124 serving as a path or passage through which radiation produced by the collision of the electron beam E with the radiation generating target 122 flows or travels may be formed at one side of the cover plate 121b.

A recessed surface may be formed on a front surface of the cover plate 121b to be recessed with a predetermined depth. The radiation irradiation hole 124 may be formed at one side of the recessed surface.

As illustrated in FIG. 4, a vacuum feed through 127 is installed between the cover plate 121b and a bevel gear 126c in a manner of surrounding a rotating (or rotational) shaft 125, so as to connect the housing 121a forming a vacuum state therein and the driving part 126 having a non-vacuum state therein.

In addition, as depicted in FIG. 5, the radiation irradiation hole 124 may be provided at a position that overlaps an electron beam inlet hole 121c' formed at an inner case 121c, allowing radiation produced by the radiation generating target 122 to pass therethrough. The inner case 121c is installed in the housing 121a.

An electron beam irradiation hole 121a''' may be formed at one side of the housing 121a to overlap the radiation irradiation hole 124 and the electron beam inlet hole 121c'.

The driving part 126 that generates a driving force for causing the radiation generating target 122 located inside the housing 121a to move may include the rotating shaft 125 installed through the cover plate 121b and a motor 126a for rotating the rotating shaft 125.

The driving part 126 is configured to provide a driving force to the rotating shaft 125 so that a position and a rotation angle of the radiation generating target 122 are changed. The driving part 126 may include a bevel gear 126c having one end connected to the motor 126a and another end connected to the rotating shaft 125, so as to transmit a rotational force generated from the motor 126a to the rotating shaft 125.

A connection joint 126b may be installed between the motor 126a and the bevel gear 126c.

The bevel gear 126c, which is configured to transfer a kinetic force between different axes, receives a rotational force generated in the motor 126a from a direction that intersects a direction in which the rotating shaft 125 extends and transmits the rotational force to the rotating shaft 125. As illustrated in FIG. 4, the bevel gear 126c may be connected to the motor 126a through one shaft, and be connected to the rotating shaft 125 through another one shaft.

The rotating shaft 125 may extend in one direction and be installed to pass through central portions of the cover plate 121b and the radiation generating target 122. The rotating shaft 125 may be installed to pass through a rotating shaft penetration portion (not shown) that protrudes from the central portion of the cover plate 121b toward the radiation generating target 122. In addition, the radiation generating target 122 may be fixedly installed at one side of the rotating shaft 125. A rotating shaft support portion 122a may be formed at the central portion of the radiation generating target 122 to support an outer circumferential surface of the rotating shaft 125, allowing the rotating shaft support portion 122a to be rotated in one direction together with the rotating shaft 125 when the rotating shaft 125 rotates.

The motor 126a may transmit a rotational force through a motor shaft and be configured as an AC servomotor. In the present disclosure, a rotational force generated in the motor 126a may be transferred to the radiation generating target 122 through the rotating shaft 125. As the motor 126a is required to rotate the radiation generating target 122 at a high speed of 6000 rpm or higher, specifications may be determined in consideration of this.

The motor 126a may be installed in a direction that intersects an extended direction of the rotating shaft 125, and be spaced apart from the radiation irradiation hole 124. Here, the motor 126a may be installed so as not to overlap radiation passing through the radiation irradiation hole 124. This is because the performance of the motor 126a is reduced when radiation produced by the collision of an electron beam E with the radiation generating target 122 travels toward the motor 126a.

The radiation generating target 122 is installed inside the housing 121a, and serves to generate radiation by colliding an electron beam E. The radiation generating target 122 may produce radiation with different energies according to a target irradiated with an electron beam E while being rotated together with the rotating shaft 125.

The radiation generating target 122 may be coupled to the rotating shaft 125 so as to rotate in one direction and produce radiation of different energies from the incident electron beam E.

The radiation generating target 122 may be disposed to be spaced apart from a front surface portion of the cover plate 121b by a predetermined distance.

The radiation generating target 122 may be configured such that a plurality of different targets 123 are installed on a plate having a triangular boomerang shape.

Here, an installation position of each target 123 and a physical property of each target 123 may vary according to the user's design.

In the depicted example, the radiation generating target 122 having three targets 123a, 123b, and 123c is provided, but this is just an example, and a shape of the plate, the number of targets, and installation positions of targets may be changed according to the user's demand.

The radiation generating target 122 may include a rotating shaft support portion 122a configured to support the rotating shaft 125, and a plurality of targets 123 installed along an outside of a circumference of the rotating shaft support portion 122a according to a specific angle and a distance. The radiation generating target 122 may be rotated together with the rotating shaft 125 with respect to the rotating shaft support portion 122a.

The radiation generating target 122 may be configured such that at least one target of the plurality of targets 123 for generating different types of radiation is disposed at each region of the plate divided into a plurality of regions. Here, each of the plurality of targets 123 may be located at an eccentric position from the rotating shaft support portion 122a.

The radiation generating target 122 may rotate together with the rotating shaft 125 at a predetermined rotation speed, and produce radiation of different energies by the plurality of targets 123 each disposed on a propagation path of an electron beam E in an overlapping manner.

The plurality of targets 123 installed at the radiation generating target 122 may be configured as a first target 123a, a second target 123b, and a third target 123c, so as to produce radiation having different energies by colliding an electron beam E. The first to third targets 123a, 123b, and 123c may be made of different materials.

For example, the first target 123a may be a target for generating an X-ray, the second target 123b may be a target for generating a neutron, and the third target 123c may be a target for generating an X-ray having a different energy from the first target 123a.

When any one of the targets is not formed of a specific material, an electron beam E passes without colliding with it, so that the one target that is empty inside may be configured as a target for generating an electron beam E.

As such, the first target 123a may be configured to generate an X-ray by the collision of an electron beam E, and the second target 123b may be configured to generate neutron radiation by the collision of an electron beam E, and the third target 123c may be configured to generate an X-ray having a different energy from the first target 123a by the collision of an electron beam E. X-rays and neutron radiation may be alternately produced by the plurality of targets 123a with a predetermined time difference.

The radiation generating target 122 may rotate together with the rotating shaft 125 in a clockwise direction at a predetermined rotation speed. As each of the targets installed on the radiation generating target 122 is rotated, they may be located in a position that overlaps the radiation irradiation hole 124 formed on the cover plate 121b along an irradiation direction of an electron beam E. Using any one target disposed in an overlapping manner with the radiation irradiation hole 124, radiation may be produced by the collision of the electron beam E.

A rotation speed and a rotation direction of the radiation generating target 122, and synchronization with an electron beam E may be controlled by the trigger signal system 115.

In addition, a sensor part 126d may be installed at one side of the bevel gear 126c. The sensor part 126d may detect a position of each target 123 and transmit a signal to the trigger signal system 115. The trigger signal system 115 may control such that desired radiation is produced at a desired repetition rate according to a value set by a user in consideration of a rotational speed of the motor 126a, an incident speed of an electron beam E by the electron accelerator 113, and a position of each target.

For example, when the first target 123a disposed at the radiation generating target 122 is rotated clockwise to be located in a position that overlaps the radiation irradiation hole 124, an electron beam E incident into the housing 121a after passing through the electron gun 112 and the electron accelerator 113 may collide with the first target 123a. Then, an X-ray may be produced by the first target 123a, and the generated X-ray may be supplied to a device connected to the radiation irradiation hole 124. Similarly, a neutron may be produced by the second target 123b.

Figure 6:
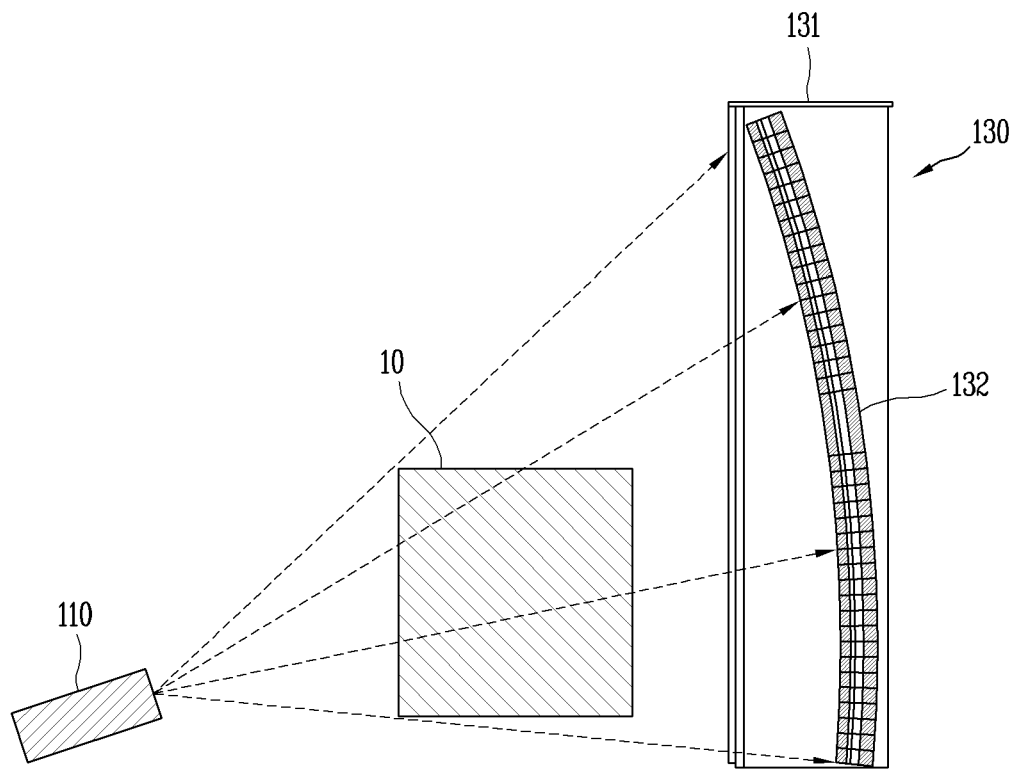
FIG. 6 is a schematic view of a security screening device viewed from the side.
Figure 7:
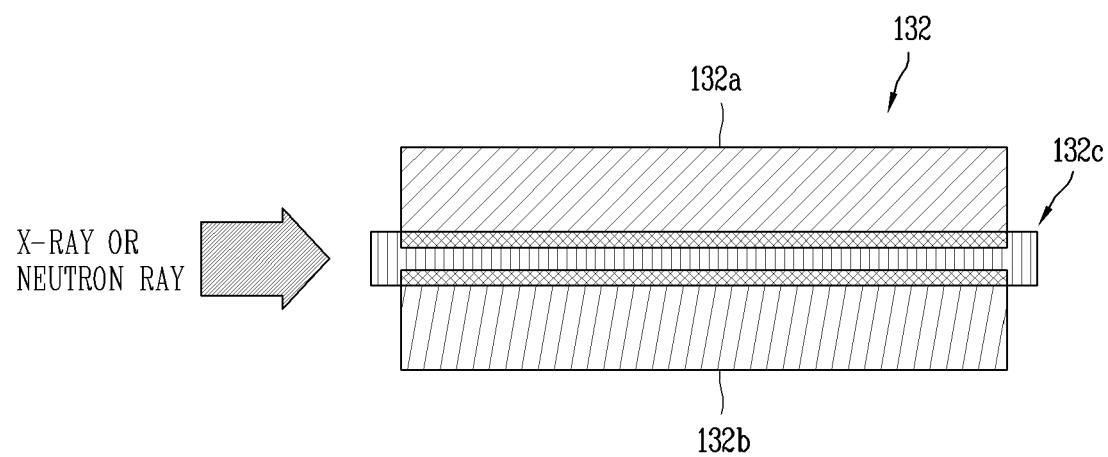
FIG. 7 is an enlarged view of a radiation detector.

FIG. 6 is a schematic view of a security screening device viewed from the side, and FIG. 7 is an enlarged view of a radiation detector.

The radiation detector 130 may be located at an opposite side of the inspection object transfer unit 140 to face the radiation generator 110.

The radiation detector 130 may include a radiation detector body 131 and a radiation image sensor module 132.

The radiation detector body 131 may have a rectangular columnar shape extending in a vertical direction. The radiation detector body 131 is configured such that radiation is irradiated through a front surface thereof with respect to a radiation irradiation direction.

The radiation image sensor module 132 may be configured such that a plurality of radiation image sensor modules 132 are installed in the radiation detector body 131 in a stacking manner. In order to prevent distortion when detecting radiation, the plurality of radiation image sensor modules 132 may be disposed in a curved manner to have a predetermined curvature, so that a distance from the front surface of radiation detector body 131 gradually decreases from the bottom to the top.

Radiation image sensor modules 132 located at a lower portion of the radiation detector body 131 may be disposed adjacent to a rear surface of the radiation detector body 131, and radiation image sensor modules 132 located at an upper portion of the radiation detector body 131 may be installed adjacent to the front surface of the radiation detector body 131. The plurality of radiation image sensor modules 132 may be disposed to be spaced apart from the radiation generator 110 by a predetermined distance.

The plurality of radiation image sensor modules 132 may include an X-ray scintillator 132a, a neutron scintillator 132b, and a photodetector 133c.

The X-ray scintillator 132a interacts with X-rays to emit a flash of light or scintillation. The X-ray scintillator 132a absorbs energy from incident X-rays, causing an electron to be excited, and as the electron returns to a ground state, an electromagnetic wave having a wavelength corresponding to the energy difference between the excited state and the ground state is emitted to thereby produce light.

The neutron scintillator 132b interacts with neutron radiation to emit a flash light or scintillation. The neutron scintillator 132b absorbs energy from incident neutron radiation, causing an electron to be excited, and as the electron returns to a ground state, an electromagnetic wave having a wavelength corresponding to the energy difference between the excited state and the ground state is emitted to thereby produce light.

As the X-ray scintillator 132a and the neutron scintillator 132b are mounted to both sides of a substrate through a semiconductor process, the photodetector 133c absorbs scintillation produced by the X-ray scintillator 132a or the neutron scintillator 132b and converts light energy into electrical energy to generate current. Accordingly, the photodetector 133c may detect each radiation passed through the inspection object 10 and containing substance and image information.

Figure 8:
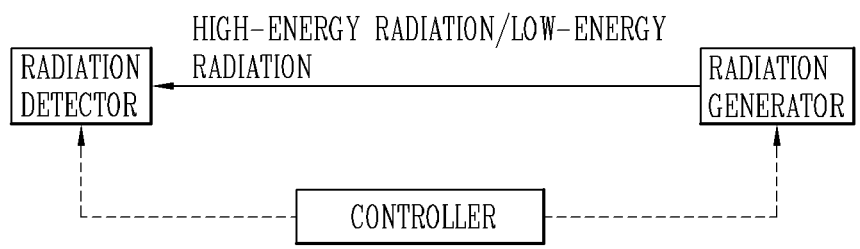
FIG. 8 is a block diagram illustrating the control of a radiation generator and a radiation detector by a controller.
Figure 9:
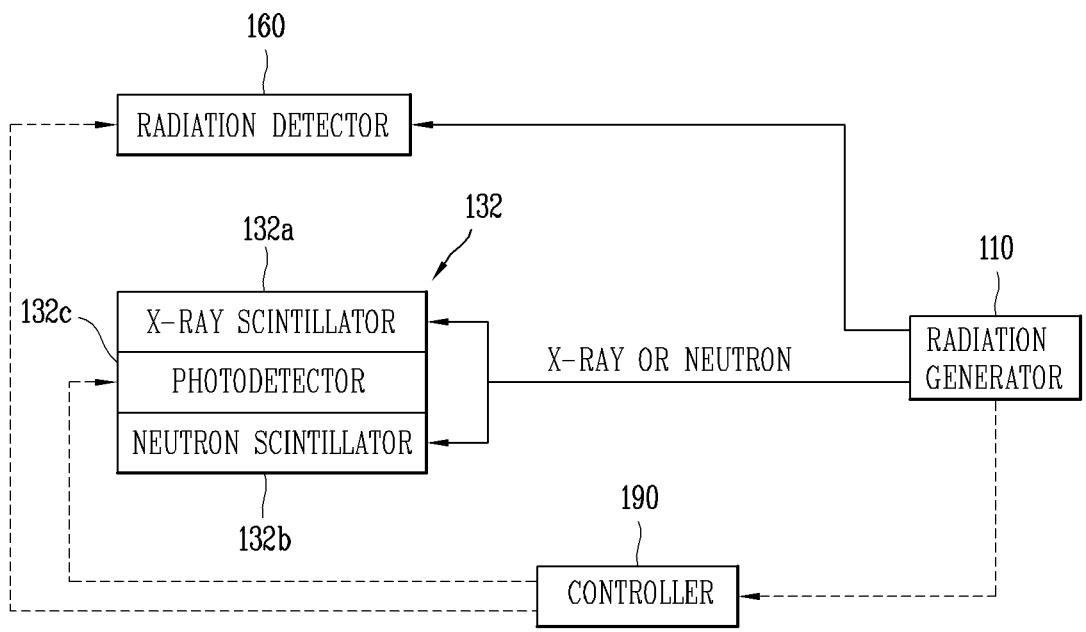
FIG. 9 is a schematic view illustrating the control of a security screening device by a controller.

FIG. 8 is a block diagram illustrating the control of a radiation generator and a radiation detector by a controller, and FIG. 9 is a schematic view illustrating the control of a security screening device by the controller.

A controller or control unit 190 is configured to transmit a synchronization signal to the radiation generator 110 and the radiation detector 130 to make the radiation generator 110 and the radiation detector 130 synchronize with each other. The controller 190 may control an interval of producing radiation of different energies to transmit the radiation to the inspection object 10 to thereby derive image information from the radiation passed through the inspection object 10.

For example, when an X-ray is irradiated from the radiation generator 110, the controller 190 may output a synchronization signal for detecting radiation corresponding to the X-ray and transmit it to the photodetector 133c, and the photodetector 133c may detect X-ray scintillation produced by the X-ray scintillator 132a to create an image conveying shape information via the signal detected by the photodetector 133c.

When neutron radiation is irradiated by the radiation generator 110, the controller 190 may output a synchronization signal corresponding to the neutron radiation and transmit it to the photodetector 133c, and the photodetector 133c may detect neutron radiation scintillation produced by the neutron scintillator 132b to create an image conveying substance information via the signal detected by the photodetector 133c.

As an X-ray and neutron radiation are alternately produced and irradiated with a time difference by the radiation generator 110, and the radiation detector 130 receives a synchronization signal from the controller 190, a detection time of the X-ray or the neutron radiation may be synchronized with an irradiation time of the X-ray or the neutron radiation of the radiation generator 110, allowing an X-ray detection signal and a neutron radiation detection signal to be distinguished from each other.

Incident signals of an X-ray and neutron radiation may be respectively synchronized with detection signals of the X-ray and the neutron radiation to correspond to one-to-one, and an X-ray image sensor module (not shown) and a neutron radiation image sensor module (not shown) are implemented as a single complex sensor to thereby simultaneously detect an X-ray and neutron radiation. Thus, an image conveying substance information may be generated while maintaining the existing resolution.

As the detection of the X-ray and the neutron radiation are achieved by the single radiation detector 130, the size and weight reduction of the security screening device 100 may be realized.

In addition, when a gamma-ray energy spectrum line is input using a gamma ray ($\gamma$) emitted from the inspection object 10, the controller 190 may compare the gamma-ray energy spectrum line with stored gamma-ray energy spectrum line data including hazardous materials, such as explosives, illegal drugs, nuclear materials, and nuclear terror radiation sources to derive matching information, enabling a substance or material contained or located in the inspection subject 10 to be analyzed.

When at least two gamma ray detectors 160 are provided, the controller 190 may analyze respective input gamma rays to thereby identify a location of a hazardous material contained in the inspection object 10.

That is, the controller 190 may acquire image information of the inspection object 10 from radiation passed through the inspection object 10, and detect a hazardous material contained in the inspection object 10 and obtain information regarding a specific hazardous material through the gamma ray detector 160. As the controller 190 analyzes a gamma ray detected by the gamma ray detector 160, location information of a hazardous material contained in the inspection object 10 may be derived, allowing a hazardous material, such as explosives, illegal drugs, and nuclear terror radiation sources, to be more easily detected or identified.

Figure 10:
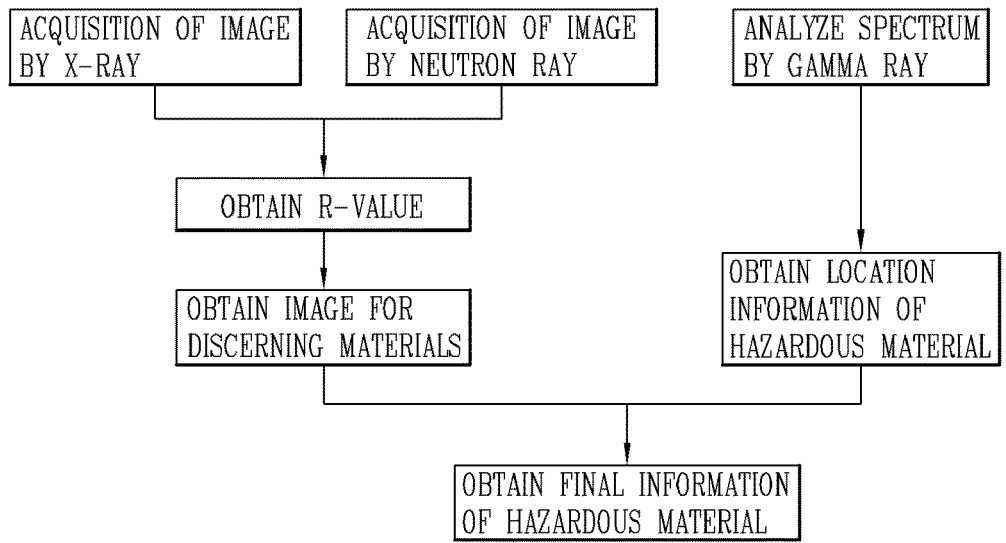
FIG. 10 is a flowchart illustrating a process of acquiring information regarding an inspection object using radiation passed through the inspection object.

FIG. 10 is a flowchart illustrating a process of acquiring information regarding an inspection object using radiation passed through the inspection object.

When an X-ray and neutron radiation produced by the radiation generator 110 are transmitted through the inspection object 10, the radiation detector 130 may acquire image information generated by the X-ray and image information generated by the neutron radiation.

Since X-rays mainly interact with electrons in a material (element), the attenuation coefficient may be determined by an atomic number of the element. Since neutron radiation mainly interacts with hydrogen in a material, the attenuation coefficient may be determined according to the distribution of hydrogens. With such complex radiation, a coefficient of discerning elements, namely, an R-value may be obtained to acquire images capable of distinguishing or more different materials.

Here, the imaging system (not shown) may receive a result detected by the radiation detector 130 from the controller 190 to create an image regarding the inspection object 10. The imaging system (not shown) may generate an image in association with the inspection object 10 based on an X-ray and neutron radiation passed through the inspection object 10.

In addition, the gamma ray detector 160 may be installed adjacent to the inspection object transfer unit 140 and detect a gamma ray emitted from the inspection object 10, and the controller 190 may analyze its information to detect the presence of a hazardous material in the inspection object 10, and accurately identify a location of the hazardous material if the hazardous material is present therein.

As the controller 190 combines image information obtained from the radiation detector 130 with substance information obtained from gamma ray detector 160, detection of a hazardous material and acquisition of final information of the hazardous material may be achieved.

Figure 11:
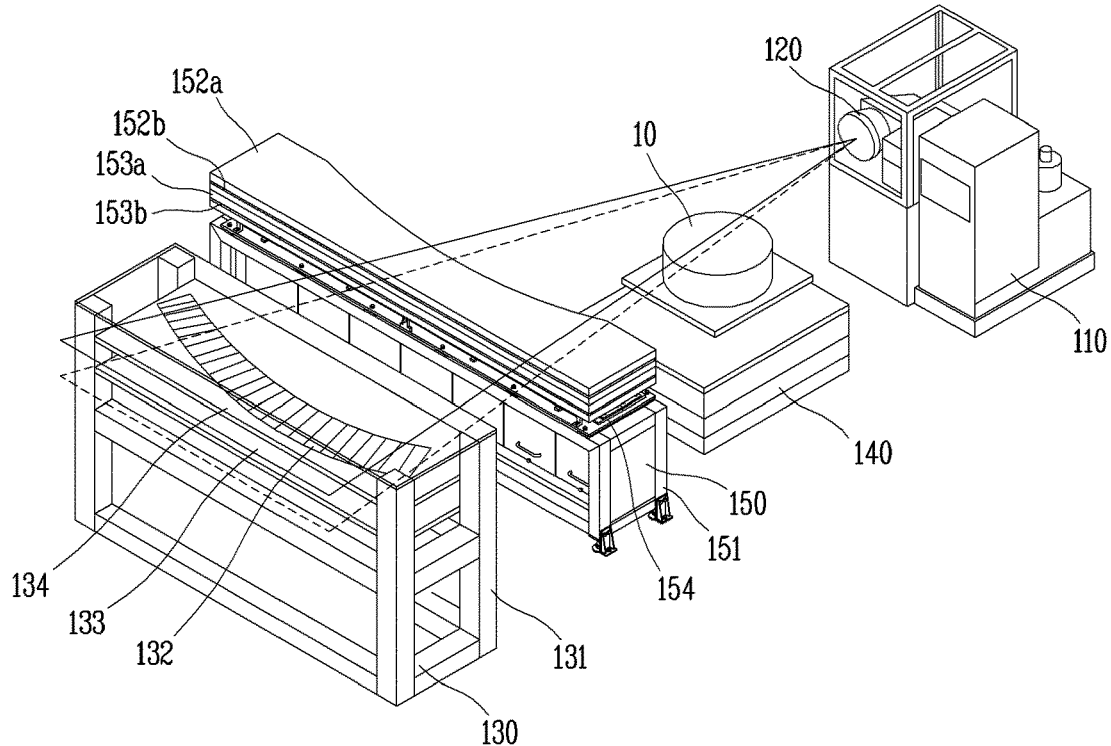
FIG. 11 is a schematic view illustrating an appearance of an example of a security screening device.
Figure 12:
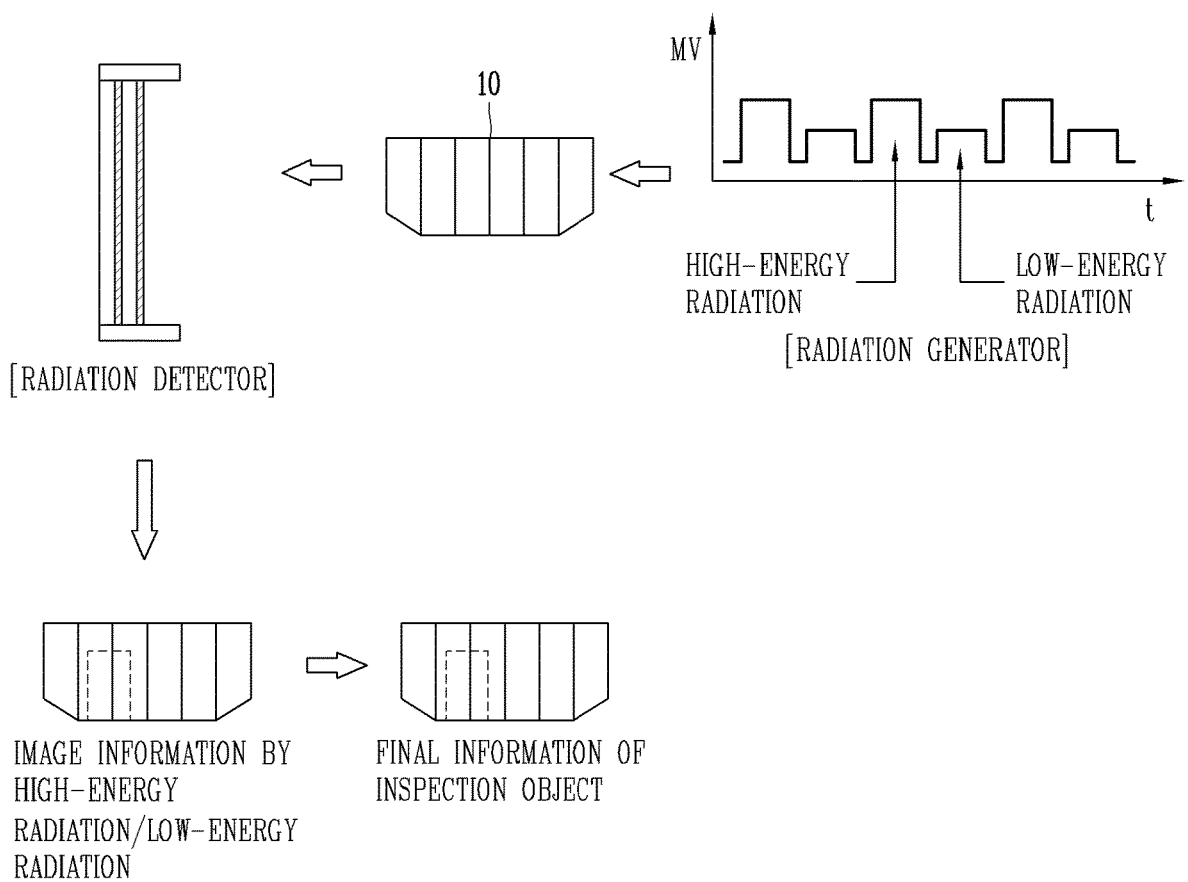
FIG. 12 is a schematic view illustrating a process of obtaining image information of an inspection object according to operation of the security screening device.

FIG. 11 is a schematic view of a security screening device according to another implementation of the present disclosure, and FIG. 12 is a schematic view illustrating a process of obtaining image information of an inspection object according to operation of the security screening device.

The security screening device 100 as described above is an example of a non-destructive testing system, and the security screening device 100 refers to a system configured to detect radiation of different energies passed through an inspection object 10 and to acquire image information regarding the inspection object 10.

As illustrated in FIG. 11, the security screening device 100 may include a radiation generator 110, a radiation detector 130, an inspection object transfer unit 140, a shielding unit 150, and an imaging system (not shown).

The radiation generator 110 is configured to produce radiation of different energies and irradiate them toward the inspection object 10. Here, the radiation having different magnitudes of energies may refer to X-rays and neutron radiation, respectively.

The radiation generator 110 according to the present disclosure may produce an X-ray and neutron radiation having different energies in an integrated manner and irradiate them toward the inspection object 10. A beam of X-rays may be irradiated to the inspection object 10 for obtaining image information regarding a shape of the inspection object 10, and a beam of neutron radiation may be used for screening substance (or material) information, such as PVC, graphite, sugar, wood, glass, radioactive material, Al, Fe, and Pb, of the inspection object 10.

The radiation generator 110 may accelerate an electron beam E produced by an electron gun 112 (see FIG. 3), in an electron accelerator 113, and collide the accelerated electron beam E with a target module 120 to generate radiation. The radiation generator 110 may also produce radiation of different energies in the form of pulsed radiation.

As illustrated in FIG. 12, the radiation generator 110 may produce radiation with low (lower) energy and radiation with high (higher) energy, each having a pulse signal, and alternately generate low-energy radiation and high-energy radiation to irradiate them toward the inspection object 10. Here, the low-energy radiation may be X-rays, and the high-energy radiation may be neutron radiation.

The inspection object transfer unit 140 configured to change a position of the inspection object 10 may move the inspection object 10 placed thereon up and down or left and right.

Information in association with the inspection object 10 may be obtained by penetrating X-rays and neutron radiation generated by the radiation generator 110 into the inspection object 10 moved by the inspection object transfer unit 140.

The radiation detector 130 is configured to detect an X-ray and neutron radiation passed through the inspection object 10. After penetrating an X-ray and neutron radiation produced by the radiation generator 110 into the inspection object 10, the radiation detector 130 detects each radiation passed through the inspection object 10.

The radiation detector 130 may include an X-ray detection part 133 and a neutron radiation detection part 134, and the X-ray detection part 133 and the neutron radiation detection part 134 may each include a plurality of radiation image sensor modules 132.

The X-ray detection part 133 may obtain image information regarding a shape of the inspection object 10 from an X-ray passed through the inspection object 10.

The neutron radiation detection part 134 is disposed adjacent to the X-ray detection part 133, and acquires image information regarding substance information of the inspection object 10 from neutron radiation passed through the inspection object 10.

The X-ray detection part 133 and the neutron radiation detection part 134 may be integrally formed to construct the radiation detector 130.

The X-ray detection part 133 and the neutron radiation detection part 134 may be spaced apart from each other at a predetermined angle to correspond to a propagation path of an X-ray and neutron radiation transmitted through the inspection object 10. In detail, the X-ray detection part 133 and the neutron radiation detection part 134 may be disposed to intersect with each other, and be approximately 90 degrees apart from each other. Here, information detected by the X-ray detection part 133 and information detected by the neutron radiation detection part 134 may be individually or separately processed without interference, allowing high image quality for analyzing the inspection object to be acquired.

The security screening device 100 according to the present disclosure may further include a shielding unit 150.

The shielding unit 150 is installed along a propagation path of an X-ray and neutron radiation and is configured to prevent interference between the X-ray and the neutron radiation. The shielding unit 150 is installed along a propagation path of an X-ray and neutron radiation passed through the inspection object 10 and is configured to prevent interference between the X-ray and the neutron radiation. Here, the shielding unit 150 may refer to a collimator.

In detail, the shielding unit 150 may include a radiation generator (RG) collimator installed adjacent to the radiation generator 110, a pre-object collimator located at a position immediately before radiation is irradiated to the inspection object 10, and a detector collimator located at a position immediately before radiation passed through the inspection object 10 is detected by the radiation detector 130.

The shielding unit 150 is installed adjacent to the radiation detector 130, namely, at the front of the radiation detector 110, so as to perform a function as a detector collimator for selectively transmitting an X-ray and neutron radiation.

The shielding unit 150 is installed at the front of the radiation generator 110 along a propagation path of an X-ray and neutron radiation to selectively transmit the X-ray and the neutron radiation.

A plurality of shielding units 150 may be installed along a propagation path of radiation produced by the radiation generator 110.

In addition, the shielding unit 150 of the present disclosure may be installed between the radiation generator 110 and the inspection object 10, and may adjust a direction, width, and angle of radiation produced by the radiation generator 110 to guide the radiation to the inspection object 10.

Here, a slit may be formed on the shielding unit 150 so as to allow radiation having a predetermined shape and a width to be irradiated toward the inspection object 10. As a slit size affects a length of a radiographic image per shooting, the slit size may be determined according to generation of radiation or acquisition of frequencies controlled by a trigger signal system 115 to be described hereinafter.

A controller 190 may transmit a synchronization signal to the radiation generator 110 and the radiation detector 130 to make the radiation generator 110 and the radiation detector 130 synchronize with each other. The controller 190 may control an interval of producing radiation of different energies to transmit the radiation to the inspection object 10 to thereby derive image information from the radiation passed through the inspection object 10.

For example, when an X-ray is irradiated by the radiation generator 110, the controller 190 may output a synchronization signal for detecting radiation corresponding to the X-ray and transmit it to the X-ray detection part 133. The X-ray detection part 133 may transmit X-ray scintillation produced by X-ray scintillators 133a' and 133a" to an X-ray photodetector 132c and create an image conveying shape information of the inspection object 10 via the signal detected by the X-ray photodetector 132c.

When neutron radiation is irradiated from the radiation generator 110, the controller 190 may output a synchronization signal corresponding to the neutron radiation and transmit it to the neutron radiation detection part 134.

Then, the neutron radiation detection part 134 may transmit neutron radiation scintillation produced by neutron scintillators 134b' and 134b" and create an image conveying substance information via the signal detected by a neutron radiation photodetector 134c.

As an X-ray and neutron radiation are alternately produced and irradiated with a time difference by the radiation generator 110, and the radiation detector 130 receives a synchronization signal from the controller 190, a detection time of the X-ray or the neutron radiation may be synchronized with an irradiation time of the X-ray or the neutron radiation of the radiation generator 110, allowing an X-ray detection signal and a neutron radiation detection signal to be distinguished from each other.

Here, incident signals of an X-ray and neutron radiation may be respectively synchronized with detection signals of the X-ray and the neutron radiation to correspond to one-to-one, and the X-ray image sensor module 132b' and the neutron radiation image sensor module 131a are implemented as a single complex sensor to thereby simultaneous detect an X-ray and a neutron radiation. Thus, an image conveying substance information may be generated while maintaining the existing resolution.

As the detection of the X-ray and the neutron radiation are achieved by the single radiation detector 130, the size and weight reduction of the security screening device 100 may be realized.

The imaging system (not shown) is configured to create an image based on a result detected by the radiation detector 130. The imaging system (not shown) is designed to generate image information in association with the inspection object 10 based on X-rays passed through the inspection object 10.

The imaging system (not shown) may generate image information regarding the inspection object 10 using radiation information detected when radiation produced by the radiation generator 110 are transmitted through the inspection object 10.

That is, as illustrated in FIG. 12, a neutron that correspond to high (higher) energy and an X-ray that corresponds to low (lower) energy produced by the radiation generator 110 are irradiated to the inspection object 10, and image information generated by the high/low energy radiation is obtained by the radiation detector 130, allowing final image information regarding the inspection object 10 to be acquired.

Figure 13:
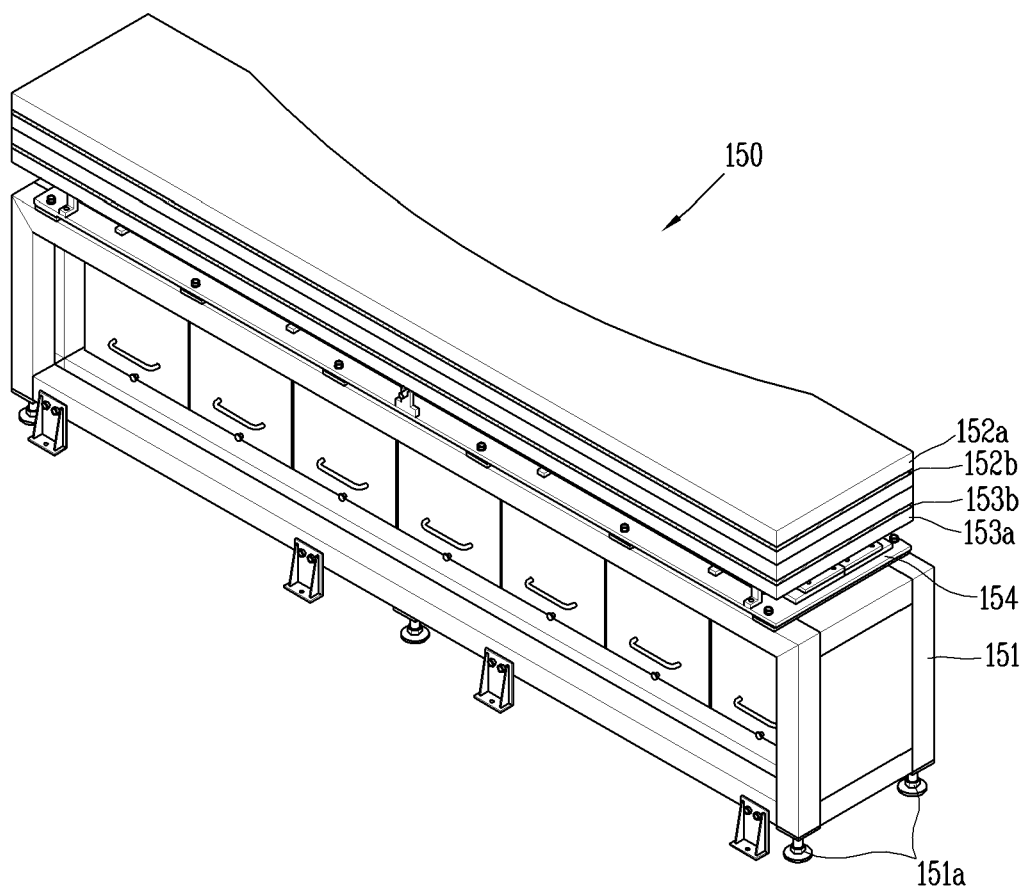
FIG. 13 illustrates a shielding unit.

FIG. 13 illustrates a shielding unit.

The shielding unit 150 that is configured to prevent interference between an X-ray and neutron radiation may be installed along a propagation path of the X-ray and the neutron radiation. The shielding unit 150 is installed along a propagation path of an X-ray and neutron radiation passed through the inspection object 10, and serves to prevent interference between the X-ray and the neutron radiation.

The shielding unit 150 may include a main body 151 that defines an outer appearance, legs 151a that support a bottom surface of the main body 151 from a lower end thereof, shield boards 152b and 153b that shield radiation, and shield board support members 152a and 153a that respectively support the shield boards 152b and 153b inserted therein. The shield boards 152b and 153b are configured to shield x-rays and neutron radiation, respectively.

The shielding unit 150 may include an X-ray shielding part (152a, 152b) and a neutron radiation shielding part (153a, 153b). The X-ray shielding part (152a, 152b) and the neutron radiation shielding part (153a, 153b) may be stacked or arranged vertically. For example, the X-ray shielding part (152a, 152b) may be disposed on the neutron radiation shielding part (153a, 153b).

However, the arrangement of the X-ray shielding part (152a, 152b) and the neutron radiation shielding part (153a, 153b) is just one example, and the arrangement may be determined according to vertical arrangement of the neutron radiation detection part 134 and the X-ray detection part 133.

Weight or load of the X-ray shielding part (152a, 152b) and the neutron radiation shielding part (153a, 153b) may be supported by a support member 154 placed on the main body 151.

Here, the shield board 152b of the X-ray shielding part (152a, 152b) may be made of lead or iron, and the shield board 153b of the neutron radiation shielding part (153a, 153b) is made of a plastic material, such as polyethylene (Pe), or cadmium (Cd). This is because propagation of X-rays can be blocked by lead or iron, and propagation of neutron radiation can be blocked by a plastic material, Pe, or Cd.

The shield board support members 152a and 153a may be configured as an X-ray shield board support member 152a and a neutron radiation shield board support member 153a, respectively. The X-ray shield board support member 152a and the neutron radiation shield board support member 153a are configured to support the shield boards 152b and 153b, respectively.

The shielding unit 150 may be installed at the front of the radiation generator 110 along a propagation path of an X-ray and neutron radiation to thereby selectively transmit the X-ray and the neutron radiation.

A plurality of shielding units 150 may be installed along a propagation path of radiation produced by the radiation generator 110.

In addition, the shielding unit 150 may be installed between the radiation generator 110 and the inspection object 10, and adjust a traveling direction, width, and angle of radiation produced by the radiation generator 110 to guide the radiation to the inspection object 10.

A slit may be formed on the shielding unit 150 so that radiation having a predetermined shape and a width may be irradiated to the inspection object 10. As a slit size affects a length of a radiographic image per shooting, the slit size may be determined according to generation of radiation or acquisition of frequencies controlled by the trigger signal system 115 to be described hereinafter.

When the shielding unit 150 is installed at the front of the radiation detector 130, the shielding unit 150 may be configured as the X-ray shielding part (152a, 152b) that is located adjacent to a front part of the neutron radiation detection part 134 and is configured to absorb X-rays, and the neutron radiation shielding part (153a, 153b) that is installed to be spaced apart from the X-ray shielding part (152a, 152b) by a predetermined distance, is located adjacent to a front part of the X-ray detection part 133, and is configured to shield neutron radiation. As X-rays are detected by the X-ray detection part 133, and neutron radiation is detected by the neutron radiation detection part 134, the occurrence of interference may be prevented.

When the shielding unit 150 is disposed between the radiation generator 110 and the inspection object 10, the X-ray shielding part (152a, 152b) including the shield board 152b and the neutron radiation shielding part (153a, 153b) including the shield board 153b may be installed along a propagation path of radiation to thereby selectively shield X-rays and neutron radiation.

In detail, when X-rays are generated, a position of the shield board 152b of the X-ray shielding part (152a, 152b) may be adjusted to shield the X-rays, and when neutron radiation is generated, a position of the shield board 153b of the neutron radiation shielding part (153a, 153b) may be adjusted to shield the neutron radiation.

For example, the shield board 152b of the X-ray shielding part (152a, 152b) and the shield board 153b of the neutron radiation shielding part (153a, 153b) may be moved up and down. As the shield boards 152b and 153b move upward, the shield boards 152b and 153b may be located on a propagation path of radiation, allowing radiation to be blocked. In detail, the shield board 152b of the X-ray shielding part (152a, 152b) may move upward to shield X-rays, and the shield board 153b of the neutron radiation shielding part (153a, 153b) may also move upward to shield neutron radiation upon generating the neutron radiation.

When the shield boards 152b and 153b move downward, radiation may not be shielded.

Figure 14:
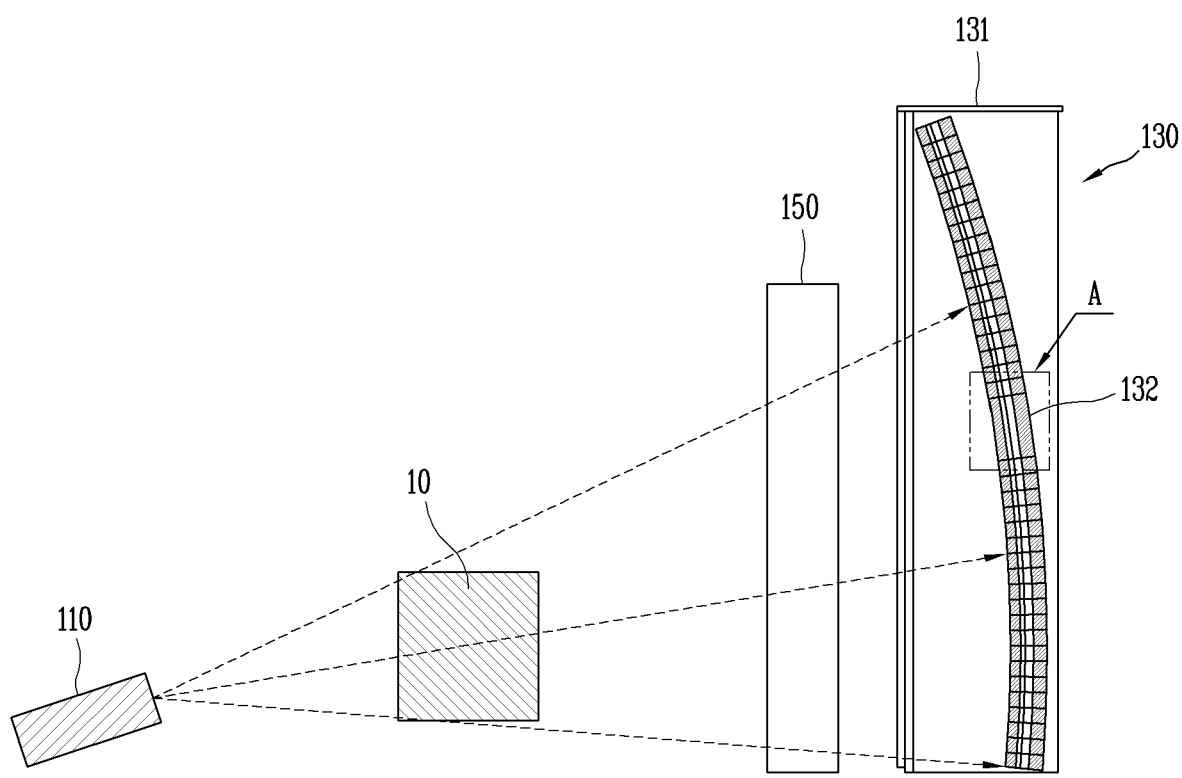
FIG. 14 is a schematic view illustrating a security screening device viewed from above.

FIG. 14 is a schematic view illustrating a security screening device viewed from above, and (a) and (b) of FIG. 15 are enlarged views of a radiation detector, respectively illustrating a neutron radiation detection part 134 and an X-ray detection part 133.

The security screening device 100 may include a radiation generator 110, a radiation detector 130, and a shielding unit 150. The radiation detector 130 may be disposed at an opposite side of the radiation generator 110 with respect to an inspection object 10.

The radiation detector 130 may include a radiation detector body 131 and a plurality of radiation image sensor modules 132.

The radiation detector body 131 may have a rectangular columnar shape extending vertically, and radiation may be irradiated toward a front part or side of the radiation detector body 131 with respect to a radiation irradiation direction.

The plurality of radiation image sensor modules 132 may be configured as an X-ray detection module for detecting X-rays and a neutron radiation detection module for detecting neutron radiation. The X-ray detection module and the neutron radiation detection module for detecting the neutron radiation may be vertically arranged with respect to each other.

The X-ray detection module and the neutron radiation detection module 131a may each have a structure in which a plurality of small parts of detection modules are arranged side by side in the radiation detector body 130a.

Here, the plurality of radiation image sensor modules 132 may be forwardly curved to have a predetermined curvature in order to prevent distortion when detecting radiation.

The X-ray detection module 132a may include X-ray scintillators 133a' and 133a" and an X-ray photodetector 132c. In addition, the neutron radiation detection module 131a may include neutron scintillators 131b' and 131b", and a neutron radiation photodetector 134c.

The X-ray scintillators 133a' and 133a" interact with X-rays to emit a flash of light or scintillation. The X-ray scintillators 132a' and 132a" absorb energy from incident X-rays, causing an electron to be excited, and as the electron returns to a ground state, an electromagnetic wave having a wavelength corresponding to the energy difference between the excited state and the ground state is emitted to thereby produce light.

As the X-ray scintillators 133a' and 133a" are mounted to both sides of a substrate through a semiconductor process, the X-ray photodetector 132c absorbs scintillation produced by the X-ray scintillators 133a' and 133a" and converts light energy into electrical energy to generate current. Through this current, the X-ray photodetector 132c may detect each radiation passed through the inspection object 10 and containing substance and image information.

In addition, the neutron scintillator 134b' and 134b" interact with neutron radiation to emit a flash of light or scintillation. The neutron scintillators 134b' and 134b" absorb energy from incident neutron radiation, causing an electron to be excited, and as the electron returns to a ground state, an electromagnetic wave having a wavelength corresponding to the energy difference between the excited state and the ground state is emitted to thereby produce light.

As the neutron scintillators 134b' and 134b" are mounted to both sides of a substrate through a semiconductor process, the neutron radiation photodetector 134c absorbs scintillation produced by the neutron scintillators 134b' and 134b" and converts light energy into electrical energy to generate current. Through this current, the neutron radiation photodetector 134c may detect each radiation passed through the inspection object 10 and containing substance and image information.

FIG. 16 illustrates a security screening device according to another implementation of the present disclosure.

A security screening device 100 of this example may include a radiation generator 110, a radiation detector 130, an inspection object transfer unit 140, a shielding unit 150, a controller 190, and an imaging system (not shown), and may further include gamma ray detectors 150a and 150b.

Configurations of the radiation generator 110, the radiation detector 130, the inspection object transfer unit 140, the shielding unit 150, the controller 190, and the imaging system (not shown) of the security screening device 100 of this example are the same as those of the security screening device 100 of the previous example, and thus redundant descriptions thereof will be omitted.

The security screening device 100 according to this implementation may use the gamma ray detectors 150a and 150b to analyze a hazardous material and identify a location of the hazardous material through neutron activation analysis.

For example, when neutrons produced by the radiation generator 110 are irradiated to the inspection object 10, gamma rays (or gamma radiation) (γ) are emitted from the inspection object 10. The gamma ray detectors 150a and 150b may analyze these gamma rays (γ) using the neutron radiation analysis to thereby identify a location of a hazardous material, such as explosives, illegal drugs, nuclear materials, and nuclear terror radiation sources, contained or hidden in the inspection object 10.

Neutron activation analysis (NAA) is a method of quantitative analysis used to determine the amount or concentrations of elements present in a sample by measuring gamma rays emitted from the sample that was irradiated by neutrons, causing the elements in the sample to form radioactive isotopes. The NAA relies on analysis of the density or dose of gamma rays emitted from a sample that was irradiated by neutrons, thereby allowing non-destructive analysis.

The gamma ray detectors 150a and 150b may perform quantitative analysis on a gamma-ray energy spectrum by using gamma-ray spectroscopy that analyzes gamma rays produced by neutrons incident on an inspection object. The gamma-ray energy spectrum may be produced by measuring the energy of gamma ray photons having high energy (or high energy level), which are highly particulate in nature.

When analyzing the gamma-ray energy spectrum obtained by the gamma ray detectors 150a and 150b, it is compared with the existing data of hazardous materials, such as explosives, illegal drugs, nuclear materials, and nuclear terror radiation sources, to determine whether a match exists, allowing a hazardous material contained in the inspection subject 10 to be accurately identified.

Gamma-ray spectroscopy is an example of the NAA, which is used for sodium iodide (NaI) scintillation counters and germanium detectors. By analyzing gamma rays using the gamma-ray spectroscopy, analysis of a tiny amount of an element, which cannot be achieved through chemical analysis, can be available, and several elements of various types of samples can be simultaneously analyzed in a non-destructive manner.

The gamma-ray detectors 150a and 150b may be implemented by using a high-resolution room-temperature semiconductor detector capable of 3D position sensing and Compton imaging, allowing a gamma-ray energy spectrum generated through the NAA to be thoroughly analyzed. Further, a location of a hazardous material, such as a nuclear material and a nuclear terror radiation source, in cargo, which is difficult to detect may be tracked to thereby identify hazardous materials and the like, which are unavailable to be screened with the conventional or existing systems at airports and ports.

In addition, when at least two gamma ray detectors 150a and 150b are installed at the security screening device 100, coordinates on X, Y, and Z axes of a hazardous material contained or hidden in the inspection object 10 may be accurately detected by triangulation to thereby derive a location of the hazardous material.

As illustrated in FIG. 16, the plurality of gamma ray detectors 150a and 150b may be disposed at opposite sides along a radiation propagation path.

A beam of neutron radiation having higher energy and a beam of X-rays having lower energy produced by the radiation generator 110 are irradiated to the inspection object 10, and are then detected by the radiation detector 130 to thereby acquire image information regarding the inspection object 10. Here, a gamma ray produced when neutron radiation collides with the inspection object is analyzed by the gamma ray detectors 150a and 150b to obtain location information of the inspection object 10.

The radiation generator 110 and the radiation detector 130 may be controlled by the controller 190.

The controller 190 may transmit a synchronization signal to the radiation generator 110 and the radiation detector 130 to make the radiation generator 110 and the radiation detector 130 synchronize with each other. The controller 190 may control an interval of producing neutron radiation and an X-ray to project them at the inspection object 10 to thereby derive radiograph image information using the radiation passed through the inspection object 10.

For example, when an X-ray is irradiated from the radiation generator 110, the controller 190 may output a synchronization signal for detecting radiation corresponding to the X-ray and transmit it to the X-ray detection part 133. The X-ray detection part 133 may transmit X-ray scintillation produced by the X-ray scintillators 133a' and 133a'' to the X-ray photodetector 132c, thereby creating an image conveying shape information of the inspection object 10 via the signal detected by the photodetector 133c.

When neutron radiation is irradiated from the radiation generator 110, the controller 190 may output a synchronization signal corresponding to the neutron radiation and transmit it to the neutron radiation detection part 131.

The neutron radiation detection part 134 may transmit neutron radiation scintillation produced by the neutron scintillators 131b' and 131b'', and create an image conveying substance information via the signal detected by the neutron radiation photodetector 134c.

As an X-ray and neutron radiation are alternately produced and irradiated with a time difference by the radiation generator 110, and the radiation detector 130 receives a synchronization signal from the controller 190, a detection time of the X-ray or the neutron radiation may be synchronized with an irradiation time of the X-ray or the neutron radiation of the radiation generator 110, allowing an X-ray detection signal and a neutron radiation detection signal to be distinguished from each other.

Here, incident signals of an X-ray and neutron radiation may be respectively synchronized with detection signals of the X-ray and the neutron radiation to correspond to one-to-one, and an X-ray image sensor module (not shown) and a neutron radiation image sensor module (not shown) are implemented as a single complex sensor to thereby simultaneously detect an X-ray and a neutron radiation. Thus, an image conveying substance information may be generated while maintaining the existing resolution.

In the present disclosure, as the detection of the X-ray and the neutron radiation are achieved by the single radiation detector 130, the size and weight reduction of the security screening device 100 may be realized.

When a gamma-ray energy spectrum line is input using a gamma ray (γ) emitted from the inspection object 10, the controller 190 may compare the gamma-ray energy spectrum line with stored gamma-ray energy spectrum line data including hazardous materials, such as explosives, illegal drugs, nuclear materials, and nuclear terror radiation sources to derive matching information, enabling a substance or material contained or located in the inspection subject to be analyzed.

In addition, as at least two gamma ray detectors 150a and 150b are provided, the controller 190 may analyze gamma rays input to the respective gamma ray detectors 150a and 150b to thereby identify a location of a hazardous material contained in the inspection object 10.

The controller 190 may acquire image information of the inspection object from radiation transmitted through the inspection object 10, and detect the presence of a hazardous material located in the inspection object 10 and obtain information regarding a specific hazardous material through the gamma ray detectors 150a and 150b, allowing hazardous materials, such as explosives, illegal drugs, and nuclear terror radiation sources, to be more easily detected or identified.

The imaging system (not shown) is configured to create an image based on a result detected by the radiation detector 130. The imaging system (not shown) is designed to generate image information in association with the inspection object 10 based on X-rays passed through the inspection object 10.

The imaging system (not shown) may obtain image information regarding the inspection object 10 using information of radiation detected when radiation produced by the radiation generator 110 are transmitted through the inspection object 10.

That is, the security screening device 100 according to the present disclosure may use the gamma ray detectors 160a and 160b to analyze a hazardous material and identify a location of the hazardous material through neutron activation analysis.

When neutrons produced by the radiation generator 110 are irradiated to the inspection object 10, gamma rays (or gamma radiation) (γ) are emitted from the inspection object 10. The gamma ray detectors 160a and 160b analyze these gamma rays (γ) using the neutron activation analysis to thereby identify a location of a hazardous material, such as explosives, illegal drugs, nuclear materials, and nuclear terror radiation sources, contained or hidden in the inspection object 10.

That is, a neutron having higher energy and an X-ray having lower energy produced by the radiation generator 110 are irradiated to the inspection object 10, and are then detected by the radiation detector 130 to thereby obtain image information regarding the inspection object 10 through the radiation detector 130. In addition, a gamma ray generated when a neutron collides with the inspection object 10 is analyzed by the gamma ray detectors 160a and 160b to obtain location information of the inspection object 10.

FIG. 17 illustrates a security screening device according to another implementation of the present disclosure.

A security screening device 100 of this example may include a radiation generator 110, a radiation detector 130, an object transfer unit 140, a shielding unit 150, a controller 190, an imaging system (not shown), and gamma ray detectors 160a and 160b.

Configurations of the radiation detector 130, the inspection object transfer unit 140, the shielding unit 150, the controller 190, the imaging system (not shown), and the gamma ray detectors 160a and 160b of the security screening device 100 of this example are the same as those of the configuration of the security screening device of the previous example, and thus redundant descriptions thereof will be omitted.

The security screening device 100 may further include a sub shielding unit 170 disposed adjacent to the radiation generator 110.

The sub shielding unit 170 may be disposed adjacent to the radiation generator 110 and selectively transmit X-rays and neutron radiation. The sub shielding unit 170 may refer to the collimator described above.

The sub shielding unit 170 may include an X-ray sub shielding part 172 configured to absorb X-rays, and a neutron radiation sub shielding part 173 configured to shield neutron radiation.

Here, the X-ray sub shielding part 172 and the neutron radiation sub shielding part 173 may be arranged vertically with respect to each other. As a vertical height of the sub shielding unit 170 is adjustable, X-rays or neutrons produced by the radiation generator 110 may be fundamentally blocked.

The sub shielding unit 170 may be installed at the front of the radiation generator 110, and include the X-ray sub shielding part 172 configured to absorb X-rays and the neutron radiation sub shielding part 173 configured to shield neutron radiation.

As the sub shielding unit 170 controls a propagation angle of an X-ray and neutron radiation produced by the radiation generator 110, interference between the X-ray and the neutron radiation transmitted through an inspection object 10 may be prevented.

For example, the sub shielding unit 170 may be disposed between the radiation generator 110 and the inspection object 10. Thus, X-rays and neutron radiation may be selectively shielded by the X-ray sub shielding part 172 and the neutron radiation sub shielding part 173 that construct the sub shielding unit 170.

In the security screening device 100 according to this implementation, the shielding unit 150 and the radiation detector 130 are integrally formed, enabling an installation space of the security screening device 100 to be reduced.

In addition, the radiation detector 130 and the shielding unit 150 may be moved back and forth along a prorogation path of an X-ray and neutron radiation by a transfer system 180. This is to more accurately detect radiation passed through the inspection object 10 by adjusting a distance between the radiation generator 110 and the radiation detector 130. For example, in order to more accurately detect neutrons passed through the inspection object 10 that was irradiated by neutrons generated in the radiation generator 110, the radiation detector 130 and the shielding unit 150 may be moved toward the radiation generator 110 by the transfer system 180.

According to the operation of the security screening device 100, final information of the inspection object may be acquired.

The radiation generator 110 may produce radiation with low (lower) energy and radiation with high (higher) energy, each having a pulse signal, and alternately generate low-energy radiation and high-energy radiation to irradiate them toward the inspection object 10. Here, the low-energy radiation may be X-rays, and the high energy-radiation may be neutron radiation.

As both an X-ray and neutron radiation produced by the radiation generator 110 can pass through the inspection object 10, the security inspection device 100 may be configured to obtain information regarding the inspection object 10.

The radiation detector 130 is configured to detect X-rays and neutron radiation passed through to the inspection object 10. When each of an X-ray and neutron radiation produced by the radiation generator 110 are transmitted through the inspection object 10, the radiation detector 130 may detect each radiation passed through the inspection object 10. The radiation detector 130 may include a neutron radiation detection part 134 and an X-ray detection part 133.

When an X-ray and neutron radiation produced by the radiation generator 110 are transmitted through the inspection object 10, the radiation detector 130 may acquire image information generated by the X-ray and image information generated by the neutron radiation without causing interference to each other.

Since X-rays mainly interact with electrons in a material (element), the attenuation coefficient may be determined by an atomic number of the element. Since neutron radiation mainly interacts with hydrogen in a material, the attenuation coefficient may be determined according to the distribution of hydrogens. With such complex radiation, a coefficient of discerning elements, namely, an R-value may be obtained to acquire images capable of distinguishing or more different materials.

Here, the imaging system (not shown) may receive a result detected by the radiation detector 130 from the controller 190 to create an image regarding the inspection object 10. The imaging system (not shown) may generate an image in association with the inspection object 10 based on an X-ray and neutron radiation passed through the inspection object 10.

In addition, the gamma ray detectors 160a and 160b may be installed adjacent to the object transfer unit 140 and detect a gamma ray emitted from the inspection object 10, and the controller 190 may analyze its information to detect the presence of a hazardous material in the inspection object 10, and accurately identify a location of the hazardous material if the hazardous material is present therein.

As the controller 190 combines image information of the inspection object 10 obtained from the radiation detector 130 with substance and location information of the inspection object 10 acquired through the gamma ray detectors 160a and 160b, detection of a hazardous material and acquisition of final information of the hazardous material may be achieved.

The security screening device is not limited to the configurations and the methods of the implementations described above, but the implementations may be modified so that all or some of the implementations are selectively combined.

INDUSTRIAL AVAILABILITY

Implementations of the present disclosure may be variously applied or applicable to industrial fields that produce or use a device generating radiation to screening or scan an inspection object.

The invention claimed is:

1. A security screening device, comprising:
a radiation generator configured to produce an X-ray and neutron radiation and irradiate the X-ray and the neutron radiation toward an inspection object;
an inspection object transfer unit configured to change a position of the inspection object;
a radiation detector configured to detect an X-ray and neutron radiation passed through the inspection object; and
at least two gamma ray detectors that are installed adjacent to the inspection object and are configured to detect a gamma signal generated from the inspection object;
wherein the radiation detector obtains image information of the inspection object using radiation information detected from the X-ray and the neutron radiation passed through the inspection object, and
wherein a controller, configured to control the radiation detector and the radiation detector, analyzes the detected gamma signal to analyze the inspection object, and identifies a location of a hazardous material contained in the inspection object from the image information,
wherein the at least two gamma ray detectors are located parallel to each other and are located along an entirety of each side of the inspection object transfer unit respectively.

2. The device of claim 1, wherein the at least two gamma ray detectors are configured to measure and analyze a detection time of a gamma ray produced by the collision of a neutron with the inspection object, so as to derive the location of the inspection object.

3. The device of claim 1, wherein the at least two gamma ray detectors are configured to analyze a substance of the inspection object by producing a gamma-ray spectrum from the received gamma signal.

4. The device of claim 1, wherein the X-ray and the neutron radiation are alternately produced with a predetermined time difference by the radiation generator to be irradiated toward the inspection object.

5. The device of claim 1, further comprising an imaging system configured to obtain image information regarding the inspection object using radiation information detected from the X-ray and the neutron radiation that have passed through the inspection object.

6. The device of claim 1, wherein the X-ray and the neutron radiation are alternately produced with a predetermined time difference by the radiation generator to be irradiated toward the inspection object,
the radiation generator includes:
an electron gun configured to produce an electron beam;
an electron accelerator that is connected to the electron gun and is configured to accelerate the electron beam generated by the electron gun; and
a target module that is connected to the electron accelerator and is configured to generate radiation by being irradiated with the electron beam accelerated by the electron accelerator.

7. A security screening device, comprising:
a radiation generator configured to produce an X-ray and neutron radiation and irradiate the X-ray and the neutron radiation toward an inspection object;
an inspection object transfer unit configured to change a position of the inspection object;
a shielding unit that is installed along a propagation path of the X-ray and the neutron radiation and selectively allows the X-ray and the neutron radiation to pass therethrough to prevent interference between the X-ray and the neutron radiation;
a radiation detector that is located at an opposite side of the radiation generator with the inspection object interposed therebetween and is configured to detect the X-ray and the neutron radiation that pass through the inspection object; and
a gamma ray detector that is installed adjacent to the inspection object and is configured to detect a gamma signal generated from the inspection object,
wherein the shielding unit includes:
an X-ray shielding part adjacent to a front side of the neutron radiation detection part to absorb an X-ray; and
a neutron radiation shielding part vertically disposed with respect to the X-ray shielding part and adjacent to a front side of the X-ray detection part to shield neutron radiation.

8. The device of claim 7, wherein the radiation detector includes:
an X-ray detection part configured to obtain image information regarding a shape of the inspection object from the X-ray passed through the inspection object; and
a neutron radiation detection part that is disposed adjacent to the X-ray detection part and is configured to obtain image information regarding a substance of the inspection object from the neutron radiation passed through the inspection object.

9. The device of claim 8, wherein the X-ray detection part and the neutron radiation detection part are integrally formed.

10. The device of claim 8, wherein the X-ray detection part and the neutron radiation detection part are spaced apart from each other while forming a predetermined angle with respect to a propagation direction of the X-ray and the neutron radiation passed through the inspection object.

11. The device of claim 8, further comprising a controller configured to transmit a synchronization signal to the radiation generator and the radiation detector so that the radiation generator and the radiation detector are synchronized with each other,
wherein the controller transmits a signal for distinguishing a time at which the X-ray reaches the X-ray detection part and a time at which the neutron radiation reaches the neutron radiation detection part.

12. The device of claim 7, further comprising a sub shielding unit disposed adjacent to the radiation generator to selectively allows the X-ray and the neutron radiation to pass therethrough.

13. The device of claim 12, wherein the sub shielding unit includes an X-ray sub shielding part configured to absorb an X-ray, and a neutron radiation sub shielding part configured to shield neutron radiation, and
wherein the X-ray sub shielding part and the neutron radiation sub shielding part are vertically arranged with respect to each other.

14. The device of claim 7, wherein the shielding unit and the radiation detector are integrally formed.

15. The device of claim 14, further comprising a transport system that allows the radiation detector and the shielding unit to move back and forth along the propagation path of the X-ray and the neutron radiation.

16. The device of claim 7, wherein a shield board of the X-ray shielding part is made of lead or iron, and a shield board of the neutron radiation shielding part is made of polyethylene (Pe) or cadmium (Cd).

17. A security screening device, comprising:
a radiation generator configured to produce an X-ray and neutron radiation and irradiate the X-ray and the neutron radiation toward an inspection object;
an inspection object transfer unit configured to change a position of the inspection object;
a radiation detector configured to detect an X-ray and neutron radiation passed through the inspection object; and
a gamma ray detector that is installed adjacent to the inspection object and is configured to detect a gamma signal generated from the inspection object;
wherein the radiation detector obtains image information of the inspection object using radiation information detected from the X-ray and the neutron radiation passed through the inspection object, and
wherein the gamma ray detector analyzes a detected gamma ray to analyze the inspection object, and identifies a location of the inspection object from the image information,
wherein the X-ray and the neutron radiation are alternately produced with a predetermined time difference by the radiation generator to be irradiated toward the inspection object,
the radiation generator includes:
an electron gun configured to produce an electron beam;
an electron accelerator that is connected to the electron gun and is configured to accelerate the electron beam generated by the electron gun; and
a target module that is connected to the electron accelerator and is configured to generate radiation by being irradiated with the electron beam accelerated by the electron accelerator,
wherein the target module includes:
a housing having one open end and provided therein with a vacuum chamber;
an inner case having a cylindrical shape that protrudes toward the vacuum chamber to be installed inside the housing and including an electron beam inlet hole formed on a front portion thereof so as to allow the electron beam to be incident toward the housing;
a cover plate fixedly installed on the housing to cover the open one end of the housing;
a driving part including a rotating shaft installed through the cover plate and the inner case, and a motor configured to rotate the rotating shaft; and
a radiation generating target that is coupled to the rotating shaft to rotate in one direction and is configured to produce radiation of different energies as the incident electron beam passes therethrough.

18. The device of claim 17, wherein the radiation generating target includes:
a rotating shaft support portion configured to support the rotating shaft; and
a plurality of targets installed along an outer circumference of the rotating shaft support portion to be spaced apart therefrom by a predetermined distance.

19. The device of claim 18, wherein the radiation generating target is configured such at least one target of the plurality of targets for generating different types of radiation is disposed at each region of the plate divided into a plurality of regions, and
wherein the driving part is connected to the radiation generating target through the rotating shaft so as to allow the radiation generating target to rotate and determines a target to which the electron beam is irradiated.

20. The device of claim 19, wherein the plurality of targets are made of different materials, and generate radiation of different energies as the electron beam passes therethrough, and
wherein the radiation generating target produces radiation of different energies by the plurality of targets disposed on a propagation path of the electron beam while rotating at a predetermined rotation speed together with the rotating shaft.

* * * * *